US012802059B2

(12) United States Patent
Khadar et al.

(10) Patent No.: US 12,802,059 B2
(45) Date of Patent: Nov. 17, 2026

(54) GESTURE-CONTROLLED PAYMENT INSTRUMENT

(71) Applicant: Visa International Service Association, San Francisco, CA (US)

(72) Inventors: Habeeb Shaik Khadar, Chittoor (IN); Vinod Kumar Pinniboyina, Bangaluru (IN); Mohan Babu Nellore, Bangaluru (IN)

(73) Assignee: Visa International Service Association, San Francisco, CA (US)

( * ) Notice: Subject to any disclaimer, the term of this patent is extended or adjusted under 35 U.S.C. 154(b) by 4 days.

(21) Appl. No.: 18/992,714

(22) PCT Filed: Jul. 12, 2022

(86) PCT No.: PCT/US2022/036788
§ 371 (c)(1),
(2) Date: Jan. 9, 2025

(87) PCT Pub. No.: WO2024/015048
PCT Pub. Date: Jan. 18, 2024

(65) Prior Publication Data
US 2026/0010892 A1 Jan. 8, 2026

(51) Int. Cl.
*G06Q 20/34* (2012.01)
*G06F 3/01* (2006.01)
*G06F 3/0346* (2013.01)

(52) U.S. Cl.
CPC .......... *G06Q 20/352* (2013.01); *G06F 3/017* (2013.01); *G06F 3/0346* (2013.01)

(58) Field of Classification Search
CPC .......... G06Q 20/3278; G06Q 20/3224; G06Q 20/20; G06Q 20/321; G06Q 30/0267;
(Continued)

(56) References Cited

U.S. PATENT DOCUMENTS 8,608,548 B2 12/2013 Mattice et al.
8,616,984 B2 12/2013 Mattice et al.
(Continued)

OTHER PUBLICATIONS

Rankl et al., "Smart Card Handbook: Third Edition", John Wiley & Sons, Ltd, 2003.

*Primary Examiner* — Jason M. Borlinghaus
(74) *Attorney, Agent, or Firm* — The Webb Law Firm

(57) ABSTRACT

A payment instrument may include a memory, a contactless chip, a sensor, a visual output component, and/or a processor. The memory may store gesture data associated with one or more predefined gestures. The contactless chip may detect an operating field of an access device and establish a communication with the access device through a near-field communication protocol. The sensor may capture further gesture data associated with a gesture made by a user with the payment instrument in the operating field of the access device. The visual output component may provide a visual output to the user. The processor may compare the further gesture data to the gesture data to determine whether a captured gesture matches a predefined gesture, and in response to the captured gesture not matching a predefined gesture, increment a counter. The processor may control, based on a current count of the counter, the visual output component.

20 Claims, 7 Drawing Sheets

(58) Field of Classification Search
CPC ...... G06Q 20/12; G06Q 20/326; G06Q 20/36; G06Q 20/34; G06Q 20/367; G06Q 20/3227; G06Q 20/341; G06Q 20/352; G06Q 20/145; G06Q 20/3221; G06Q 20/3267
See application file for complete search history.

(56) References Cited

U.S. PATENT DOCUMENTS

| | | | | |
|---|---|---|---|---|
| 8,684,839 | B2 | 4/2014 | Mattice et al. | |
| 2011/0282785 | A1* | 11/2011 | Chin | G06Q 20/108 705/42 |
| 2012/0130895 | A1 | 5/2012 | Granbery et al. | |
| 2015/0012426 | A1 | 1/2015 | Purves et al. | |
| 2015/0348014 | A1 | 12/2015 | Van Os et al. | |
| 2016/0109954 | A1 | 4/2016 | Harris et al. | |
| 2016/0224973 | A1 | 8/2016 | Van Os et al. | |
| 2017/0038847 | A1 | 2/2017 | Schorsch et al. | |
| 2017/0154328 | A1 | 6/2017 | Zarakas et al. | |
| 2017/0255938 | A1 | 9/2017 | Biegun et al. | |
| 2018/0150846 | A1 | 5/2018 | Maheshwari et al. | |
| 2019/0122089 | A1 | 4/2019 | Benkley, III et al. | |
| 2019/0287083 | A1* | 9/2019 | Wurmfeld | G06Q 20/306 |
| 2019/0311109 | A1 | 10/2019 | D'Agostino et al. | |
| 2021/0004806 | A1* | 1/2021 | Noe | G06Q 20/3278 |
| 2021/0224785 | A1 | 7/2021 | Van Os et al. | |
| 2021/0383355 | A1 | 12/2021 | Pinniboyina et al. | |
| 2023/0214470 | A1* | 7/2023 | Tily | G06Q 20/40145 726/17 |

* cited by examiner

GESTURE-CONTROLLED PAYMENT INSTRUMENT

CROSS REFERENCE TO RELATED APPLICATIONS

This application is the United States national phase of International Patent Application No. PCT/US22/36788 filed on Jul. 12, 2022, and is related to U.S. patent application Ser. No. 17/412,478, filed on Aug. 26, 2021, which is a continuation of U.S. Pat. No. 11,132,671, issued on Sep. 28, 2021, the disclosures of which are hereby incorporated by reference in their entireties.

BACKGROUND

1. Technical Field

The present disclosure relates to performing payment transactions. For example, the disclosure relates to performing a payment transaction using a contactless payment instrument.

2. Technical Considerations

The recent rapid growth in contactless payments is shaping new behaviors in the way everyday purchases are made. Contactless payments make a transaction faster than a traditional card transaction or payment by cash. At a retailer, a contactless payment instrument owner simply holds the payment instrument within an operating field of an access device. When the payment instrument is in the operating field of the access device, the encrypted details of the payment instrument used for conducting the transaction is transmitted to the payment reader. In contactless payment, the payment instrument may never leave the owner's hand and may not be dipped in the access device. Therefore, contactless payments offer consumers a fast, secure, and convenient way to pay, providing merchants with significant opportunities to reduce queuing and improve in-store payment experience.

SUMMARY

Accordingly, provided are improved systems, devices, products, apparatus, and/or methods for performing a payment transaction using a contactless payment instrument.

According to some non-limiting embodiments or aspects, provided is a method including: storing, with a memory of a payment instrument, gesture data associated with one or more predefined gestures; detecting, with a contactless chip of the payment instrument, an operating field of an access device; establishing, with the contactless chip of the payment instrument, a communication with the access device through a near-field communication protocol; capturing, with a sensor of the payment instrument, further gesture data associated with one or more gestures made by a user with the payment instrument in the operating field of the access device; comparing, with a processor of the payment instrument, the further gesture data associated with the one or more captured gestures to the gesture data associated with the one or more predefined gestures stored in the memory of the payment instrument to determine whether a captured gesture of the one or more captured gestures matches at least one of the one or more predefined gestures; in response to the captured gesture of the one or more captured gestures not matching a predefined gesture of the one or more predefined gestures stored in the memory of the payment instrument, incrementing, with the processor of the payment instrument, a counter; and controlling, with the processor of the payment instrument, based on a current count of the counter, a visual output component of the payment instrument to provide a visual output to the user.

In some non-limiting embodiments or aspects, the method further includes: storing, with the memory of the payment instrument, a failed attempts state, wherein the failed attempts state is determined based on the current count of the counter and a predetermined threshold count stored in the memory of the payment instrument; and transmitting, with the contactless chip of the payment instrument, the failed attempts state to the access device through the established near-field communication protocol, wherein receiving the failed attempts state causes the access device to provide a message associated with the failed attempts state to the user.

In some non-limiting embodiments or aspects, the method further includes: storing, with the memory of the payment instrument, a gesture enablement state, wherein the gesture enablement state is either of "ACTIVE" state or "INACTIVE" state; determining, with the processor of the payment instrument, that the failed attempts state fails to satisfy the predetermined threshold count; and in response to determining that the failed attempts state fails to satisfy the predetermined threshold count, transmitting, with the contactless chip of the payment instrument, the gesture enablement state to the access device through the established near-field communication protocol.

In some non-limiting embodiments or aspects, the processor of the payment instrument further controls the visual output component of the payment instrument to provide the visual output to the user based on the gesture enablement state.

In some non-limiting embodiments or aspects, the method further includes: establishing, with the contactless chip of the payment instrument, another communication with a third-party application executing on an external device through the near-field communication protocol; receiving, with the contactless chip of the payment instrument, from the third-party application executing on the external device, a command to reset the current count of the counter; and in response to receiving the command, resetting, with the processor of the payment instrument, the current count of the counter.

In some non-limiting embodiments or aspects, the sensor includes at least one of the following sensors: an accelerometer, a gyroscope, a magnetometer, a pressure sensor, an altimeter, or any combination thereof.

In some non-limiting embodiments or aspects, the sensor includes the accelerometer, and wherein the accelerometer captures a tilting motion and an orientation of the payment instrument in the operating field of the access device as the further gesture data associated with the one or more gestures made by the user with the payment instrument in the operating field of the access device.

In some non-limiting embodiments or aspects, the sensor includes the gyroscope, and wherein the gyroscope captures a rotation of the payment instrument made by the user with the payment instrument in the operating field of the access device as the further gesture data associated with the one or more gestures made by the user with the payment instrument in the operating field of the access device.

In some non-limiting embodiments or aspects, the method further includes: transmitting, with the contactless chip of the payment instrument, to the access device, an authentication status associated with the user, wherein the authentication status is determined based on whether the captured gesture of the one or more captured gestures matches the at least one of the one or more predefined gestures.

In some non-limiting embodiments or aspects, the visual output component includes a multicolor light emitting diode (LED).

According to some non-limiting embodiments or aspects, provided is a payment instrument, including: a memory configured to store gesture data associated with one or more predefined gestures; a contactless chip configured to detect an operating field of an access device and establish a communication with the access device through a near-field communication protocol; a sensor configured to capture further gesture data associated with one or more gestures made by a user with the payment instrument in the operating field of the access device; a visual output component configured to provide a visual output to the user; and a processor programmed and/or configured to: compare the further gesture data associated with the one or more captured gestures to the gesture data associated with the one or more predefined gestures stored in the memory of the payment instrument to determine whether a captured gesture of the one or more captured gestures matches at least one of the one or more predefined gestures; in response to the captured gesture of the one or more captured gestures not matching a predefined gesture of the one or more predefined gestures stored in the memory of the payment instrument, increment a counter; and control, based on a current count of the counter, the visual output component of the payment instrument to provide the visual output to the user.

In some non-limiting embodiments or aspects, the memory is further configured to store a failed attempts state, wherein the failed attempts state is determined based on the current count of the counter and a predetermined threshold count stored in the memory of the payment instrument, and the contactless chip is further configured to transmit the failed attempts state to the access device through the established near-field communication protocol, wherein receiving the failed attempts state causes the access device to provide a message associated with the failed attempts state to the user.

In some non-limiting embodiments or aspects, the memory is further configured to store a gesture enablement state, wherein the gesture enablement state is either of "ACTIVE" state or "INACTIVE" state, and the processor is further programmed and/or configured to: determine that the failed attempts state fails to satisfy the predetermined threshold count; and in response to determining that the failed attempts state fails to satisfy the predetermined threshold count, control the contactless chip of the payment instrument to transmit the gesture enablement state to the access device through the established near-field communication protocol.

In some non-limiting embodiments or aspects, the processor is further programmed and/or configured to: control the visual output component of the payment instrument to provide the visual output to the user based on the gesture enablement state.

In some non-limiting embodiments or aspects, the contactless chip is further configured to establish another communication with a third-party application executing on an external device through the near-field communication protocol and receive, from the third-party application executing on the external device, a command to reset the current count of the counter, and the processor is further programmed and/or configured to: in response to receiving the command, reset the current count of the counter.

In some non-limiting embodiments or aspects, the sensor includes at least one of the following sensors: an accelerometer, a gyroscope, a magnetometer, a pressure sensor, an altimeter, or any combination thereof.

In some non-limiting embodiments or aspects, the sensor includes the accelerometer, and the accelerometer captures a tilting motion and an orientation of the payment instrument in the operating field of the access device as the further gesture data associated with the one or more gestures made by the user with the payment instrument in the operating field of the access device.

In some non-limiting embodiments or aspects, the sensor includes the gyroscope, and wherein the gyroscope captures a rotation of the payment instrument made by the user with the payment instrument in the operating field of the access device as the further gesture data associated with the one or more gestures made by the user with the payment instrument in the operating field of the access device.

In some non-limiting embodiments or aspects, the contactless chip is further configured to transmit, to the access device, an authentication status associated with the user, wherein the authentication status is determined based on whether the captured gesture of the one or more captured gestures matches the at least one of the one or more predefined gestures.

In some non-limiting embodiments or aspects, the visual output component includes a multicolor light emitting diode (LED).

Further non-limiting embodiments or aspects are set forth in the following numbered clauses:

Clause 1. A method comprising: storing, with a memory of a payment instrument, gesture data associated with one or more predefined gestures; detecting, with a contactless chip of the payment instrument, an operating field of an access device; establishing, with the contactless chip of the payment instrument, a communication with the access device through a near-field communication protocol; capturing, with a sensor of the payment instrument, further gesture data associated with one or more gestures made by a user with the payment instrument in the operating field of the access device; comparing, with a processor of the payment instrument, the further gesture data associated with the one or more captured gestures to the gesture data associated with the one or more predefined gestures stored in the memory of the payment instrument to determine whether a captured gesture of the one or more captured gestures matches at least one of the one or more predefined gestures; in response to the captured gesture of the one or more captured gestures not matching a predefined gesture of the one or more predefined gestures stored in the memory of the payment instrument, incrementing, with the processor of the payment instrument, a counter; and controlling, with the processor of the payment instrument, based on a current count of the counter, a visual output component of the payment instrument to provide a visual output to the user.

Clause 2. The method of clause 1, further comprising: storing, with the memory of the payment instrument, a failed attempts state, wherein the failed attempts state is determined based on the current count of the counter and a predetermined threshold count stored in the memory of the payment instrument; and transmitting, with the contactless chip of the payment instrument, the failed attempts state to the access device through the established near-field communication protocol, wherein receiving the failed attempts state causes the access device to provide a message associated with the failed attempts state to the user.

Clause 3. The method of clauses 1 or 2, further comprising: storing, with the memory of the payment instrument, a gesture enablement state, wherein the gesture enablement state is either of "ACTIVE" state or "INACTIVE" state; determining, with the processor of the payment instrument, that the failed attempts state fails to satisfy the predetermined threshold count; and in response to determining that the failed attempts state fails to satisfy the predetermined threshold count, transmitting, with the contactless chip of the payment instrument, the gesture enablement state to the access device through the established near-field communication protocol.

Clause 4. The method of any of clauses 1-3, wherein the processor of the payment instrument further controls the visual output component of the payment instrument to provide the visual output to the user based on the gesture enablement state.

Clause 5. The method of any of clauses 1-4, further comprising: establishing, with the contactless chip of the payment instrument, another communication with a third-party application executing on an external device through the near-field communication protocol; receiving, with the contactless chip of the payment instrument, from the third-party application executing on the external device, a command to reset the current count of the counter; and in response to receiving the command, resetting, with the processor of the payment instrument, the current count of the counter.

Clause 6. The method of any of clauses 1-5, wherein the sensor includes at least one of the following sensors: an accelerometer, a gyroscope, a magnetometer, a pressure sensor, an altimeter, or any combination thereof.

Clause 7. The method of any of clauses 1-6, wherein the sensor includes the accelerometer, and wherein the accelerometer captures a tilting motion and an orientation of the payment instrument in the operating field of the access device as the further gesture data associated with the one or more gestures made by the user with the payment instrument in the operating field of the access device.

Clause 8. The method of any of clauses 1-7, wherein the sensor includes the gyroscope, and wherein the gyroscope captures a rotation of the payment instrument made by the user with the payment instrument in the operating field of the access device as the further gesture data associated with the one or more gestures made by the user with the payment instrument in the operating field of the access device.

Clause 9. The method of any of clauses 1-8, further comprising: transmitting, with the contactless chip of the payment instrument, to the access device, an authentication status associated with the user, wherein the authentication status is determined based on whether the captured gesture of the one or more captured gestures matches the at least one of the one or more predefined gestures.

Clause 10. The method of any of clauses 1-9, wherein the visual output component includes a multicolor light emitting diode (LED).

Clause 11. A payment instrument, comprising: a memory configured to store gesture data associated with one or more predefined gestures; a contactless chip configured to detect an operating field of an access device and establish a communication with the access device through a near-field communication protocol; a sensor configured to capture further gesture data associated with one or more gestures made by a user with the payment instrument in the operating field of the access device; a visual output component configured to provide a visual output to the user; and a processor programmed and/or configured to: compare the further gesture data associated with the one or more captured gestures to the gesture data associated with the one or more predefined gestures stored in the memory of the payment instrument to determine whether a captured gesture of the one or more captured gestures matches at least one of the one or more predefined gestures; in response to the captured gesture of the one or more captured gestures not matching a predefined gesture of the one or more predefined gestures stored in the memory of the payment instrument, increment a counter; and control, based on a current count of the counter, the visual output component of the payment instrument to provide the visual output to the user.

Clause 12. The payment instrument of clause 11, wherein the memory is further configured to store a failed attempts state, wherein the failed attempts state is determined based on the current count of the counter and a predetermined threshold count stored in the memory of the payment instrument, and wherein the contactless chip is further configured to transmit the failed attempts state to the access device through the established near-field communication protocol, wherein receiving the failed attempts state causes the access device to provide a message associated with the failed attempts state to the user.

Clause 13. The payment instrument of clauses 11 or 12, wherein the memory is further configured to store a gesture enablement state, wherein the gesture enablement state is either of "ACTIVE" state or "INACTIVE" state, and wherein the processor is further programmed and/or configured to: determine that the failed attempts state fails to satisfy the predetermined threshold count; and in response to determining that the failed attempts state fails to satisfy the predetermined threshold count, control the contactless chip of the payment instrument to transmit the gesture enablement state to the access device through the established near-field communication protocol.

Clause 14. The payment instrument of any of clauses 11-13, wherein the processor is further programmed and/or configured to: control the visual output component of the payment instrument to provide the visual output to the user based on the gesture enablement state.

Clause 15. The payment instrument of any of clauses 11-14, wherein the contactless chip is further configured to establish another communication with a third-party application executing on an external device through the near-field communication protocol and receive, from the third-party application executing on the external device, a command to reset the current count of the counter, and wherein the processor is further programmed and/or configured to: in response to receiving the command, reset the current count of the counter.

Clause 16. The payment instrument of any of clauses 11-15, wherein the sensor includes at least one of the following sensors: an accelerometer, a gyroscope, a magnetometer, a pressure sensor, an altimeter, or any combination thereof.

Clause 17. The payment instrument of any of clauses 11-16, wherein the sensor includes the accelerometer, and wherein the accelerometer captures a tilting motion and an orientation of the payment instrument in the operating field of the access device as the further gesture data associated with the one or more gestures made by the user with the payment instrument in the operating field of the access device.

Clause 18. The payment instrument of any of clauses 11-17, wherein the sensor includes the gyroscope, and wherein the gyroscope captures a rotation of the payment instrument made by the user with the payment instrument in the operating field of the access device as the further gesture data associated with the one or more gestures made by the user with the payment instrument in the operating field of the access device.

Clause 19. The payment instrument of any of clauses 11-18, wherein the contactless chip is further configured to transmit, to the access device, an authentication status associated with the user, wherein the authentication status is determined based on whether the captured gesture of the one or more captured gestures matches the at least one of the one or more predefined gestures.

Clause 20. The payment instrument of any of clauses 11-19 wherein the visual output component includes a multicolor light emitting diode (LED).

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1A:
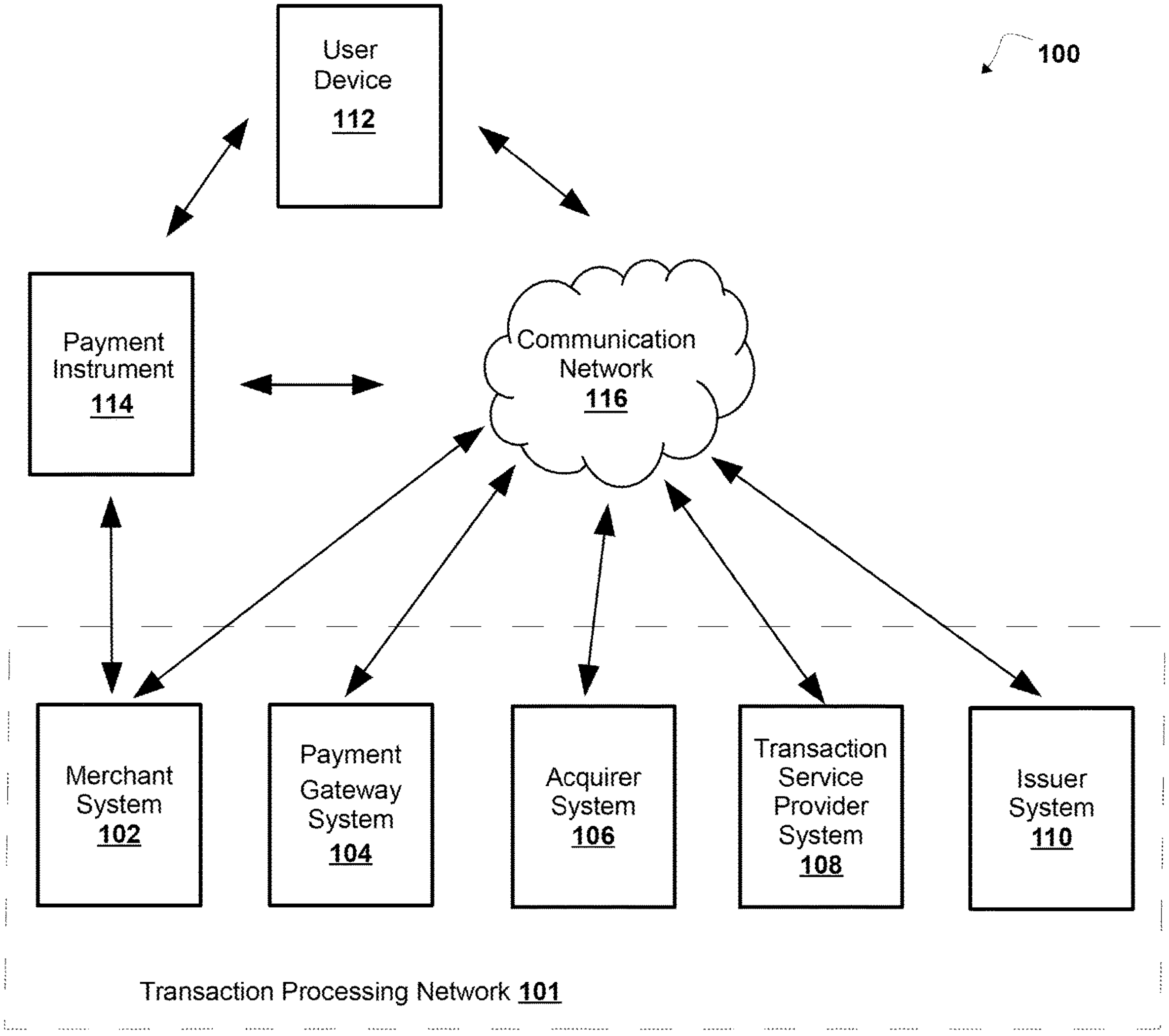
FIG. 1A is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like). The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

As used herein, the term "access device" may refer to any suitable device that provides access to a remote system. An access device may also be used for communicating with a portable device, a network computer, an authorizing entity computer, or any other suitable system. An access device may generally be located in any suitable location, such as at the location of a merchant. An access device may be in any suitable form. Some examples of access devices include point of sale (POS) devices (e.g., POS terminals), cellular phones, personal digital assistants (PDAs), personal computers (PCs), tablet PCs, handheld specialized readers, set-top boxes, electronic cash registers (ECRs), automated teller machines (ATMs), virtual cash registers (VCRs), kiosks, security systems, access systems, and the like. In some embodiments, an access device can be a device that acts as an access device at a gas station or other location.

In some embodiments, where an access device may comprise a POS terminal, any suitable POS terminal may be used and may comprise a reader, a processor, and a computer-readable medium. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards.

As used herein, the term "portable device" may refer to any suitable electronic device that may be operated by a user, which may also provide remote communication capabilities to a network of remote communication capabilities include using a mobile phone (wireless) network, wireless data network (e.g., 3G, 4G, or similar networks), Wi-Fi®, Wi-Max™, or any other communication medium that may provide access to a network such as the Internet or a private network. Examples of portable devices are mobile phones (e.g., cellular phones), PDAs, tablet computers, notebooks, laptop computers, personal music players, hand-held specialized readers, etc. Further examples of portable devices are wearable devices, such as smart watches, fitness bands, ankle bracelets, rings, earrings, etc., as well as automobiles with remote communication capabilities. In some embodiments, a portable device can function as a payment device (e.g., a portable device can store and be able to transmit payment credentials for a transaction). A "portable consumer device" may be an example of a "portable device." A portable consumer device may refer to any instrument that enables the user to make payments to a merchant. The portable consumer device may be a static instrument which provides user credentials for enabling the transactions. The portable consumer device may also be referred as a payment instrument. A credit card, a debit card, a prepaid card and a gift card may be examples of the payment instruments.

As used herein, the term "transaction data" may refer to information associated with a transaction. For example, transaction data may comprise one or more of an authorized amount (e.g., transaction amount, item value, etc.), other amount, terminal country code, terminal verification results, transaction currency code, transaction date, transaction type (e.g., card-present transaction, card-not-present transaction, high value transaction, low value transaction, local transaction, international transaction, etc.), an unpredictable number, application interchange profile (AIP), application transaction counter (ATC), issuer application data (IAD), etc.

As used herein, the term "user" may refer to an individual. In some embodiments, a user may be associated with one or more personal accounts and/or portable devices. The user may also be referred to as a cardholder, account holder, or consumer.

As used herein, the term "credentials" may refer to any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a sub token, a gift card number or code, a prepaid card number or code, a user name, an expiration date, a CVV (card verification value), a dCVV (dynamic card verification value), a CVV2 (card verification value 2), a CVC3 (card verification code), etc. An example of a PAN is a 16-digit number, such as "4147 0900 0000 1234". In some embodiments, credentials may be considered sensitive information.

As used herein, the term "authorization request message" may refer to an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV, a dCVV, a PAN, a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

As used herein, the term, an "authorization response message" may refer to a message that responds to an authorization request. In some cases, it may be an electronic message reply to an authorization request message generated by an issuing financial institution or a transaction-processing computer. The authorization response message may include, by way of example only, one or more of the following status indicators: Approval—transaction was approved; Decline—transaction was not approved; or Call Center—response pending more information, merchant to call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

As used herein, the term "authorizing entity" may refer to an entity that authorizes a request. Examples of an authorizing entity may be an issuer, a governmental agency, a document repository, an access administrator, etc. An authorizing entity may operate an authorizing entity computer.

As used herein, the term "network computer" may refer to a computer or a network of computers that processes transactions. In some embodiments, the network computer can be in an electronic system used to accept, transmit, or process transactions made by user devices for money, goods, services, or access to locations or data. The network computer may transfer information and funds among issuers, acquirers, transacting parties, and users. An example of the network computer may include a payment processing server computer such as VisaNet®, operated by Visa®. Payment processing server computers such as VisaNet® are able to process credit card transactions, debit card transactions, and other types of commercial transactions. VisaNet®, in particular includes a Visa Integrated Payments (VIP) system which processes authorization requests and a Base II system which performs clearing and settlement services. In other embodiments, a network computer can be a collection of computers that can allow access to a person seeking to access a particular location. In yet other embodiments, a network computer can be a collection of computers that can allow access to specific types of data (e.g., governmental agencies).

As used herein, the term "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The processor may include a low-power microcontroller, and/or the like.

As used herein, the term "payment platform" may refer to an environment which has multiple abstraction levels, a computer architecture and one or more hardware and software tools for enabling a transaction between two parties. The payment platform mostly provides one or more Application Program Interface (API) to issuers, acquirers and merchants on various transaction parameters. The payment platform has one or more services that can be subscribed by other stakeholders in the payment ecosystem for facilitating a transaction. The services may be related to user identity management, loyalty and offers management, risk and fraud mitigation, authentication services, processing services, on-behalf authorization, and the like. One such example of the payment platform is VisaNet™ owned and operated by Visa Inc.® which enables money transfer from one account to another account along with a host of other services mentioned above.

As used herein, the term "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Non-limiting embodiments or aspects of the present disclosure provide a method and system for transacting at a merchant location using a gesture-controlled payment instrument. As described herein, a payment instrument may include a portable consumer device that is used for carrying out a payment transaction. Examples of a payment instrument include, but are not limited to the following: a credit card, a debit card, a gift card, a prepaid card, a key fob, a payment ring, a payment band, a payment wearable, and/or the like. A payment instrument may be embedded with a chip that enables the payment instrument to transmit credentials for conducting a payment transaction. A payment instrument may be configured to conduct a payment transaction using contact and/or in a contactless manner. For example, to enable a payment instrument to conduct transactions in a contactless manner, a contactless chip, such as a near-field communication (NFC) chip, and/or the like, may be embedded on the payment instrument. The contactless chip may transmit the user's payment credentials to an access device (e.g., a POS device, etc.). The transmission of the user's payment credentials may be successful only when the payment instrument is in an operating field of the access device. The operating field of the access device may refer to a range or area in which the access device can communicate with the contactless payment instrument. The contactless chip in the payment instrument may use a standard near-field communication protocol to communicate with the access device. The contactless chip in the payment instrument may be a passive electronic device that can communicate with other electronic devices using near-field communication. The payment instrument may perform a contactless payment if the access device is enabled with the necessary hardware and software for supporting contactless transactions. For example, such an access device may be referred to as a contactless access device. A contactless access device may have, along with capabilities of processing transactions in a contactless manner, a capability to accept traditional payment instruments without using a contactless chip and/or to process the transactions in contact manner (e.g. swipe transactions, dip transactions, etc.). The contactless chip in the payment instrument may be powered up and transmit the user's payment credentials only when the payment instrument is in the field of the contactless access device. For example, when an access device is powered-up, a power-up status may be set on the access device, which may be detectable by the payment instrument. The operating field of the contactless access device may be configured according to contactless payments standards. The range or area of the operating field of the contactless access device may depend on various factors, such as hardware specifications and/or a tuning frequency of the access device. For example, an operating field in which the payment instrument can transmit the credentials to the contactless access device may be about four centimeters. When the payment instrument is not in the operating field of the contactless access device, the credentials may not be transmitted and/or the payment instrument may be powered down (e.g., one or more components of the payment instrument may be nonoperational, etc.).

Contactless transactions may be faster and easier for customers and merchants because contactless transactions may reduce an amount of time that the customer spends at a billing counter. The payment instrument need not change hands from the customer to the cashier and/or need not be dipped or swiped at the access device, which may further reduce queues and/or enable merchants to process more transactions within a given time.

Even though contactless payments may be as secure as traditional contact payment methods, consumers may want to have more control over the usage of contactless payments and/or may not want unintended transactions to take place when the payment instrument is accidentally in the field of the contactless access device. Therefore, non-limiting embodiments or aspects of the present disclosure provide an improvement to contactless payment instruments with a gesture-controlled payment instrument. Non-limiting embodiments or aspects of the present disclosure may provide a gesture-controlled payment instrument that may include an embedded gesture control module. The gesture-controlled payment instrument may have one or more gesture enablement states. A gesture enablement state in the payment instrument may determine a transmission of the user's payment credentials to a contactless access device. The one or more gesture enablement states may include an ACTIVE state and an INACTIVE state. If the gesture enablement state is in ACTIVE state, the payment instrument may be configured to transmit the credentials to the contactless access device, and if the gesture enablement state is in INACTIVE state, the payment instrument may be configured not to transmit the credentials of the user to the contactless access device. The gesture enablement state may be stored as a flag variable in the contactless chip of the payment instrument.

Non-limiting embodiments or aspects of the present disclosure may provide a gesture control module that is configured to internally communicate with the contactless chip of the payment instrument, and the contactless chip upon receiving the communication from the gesture control module, may be configured to communicate with the contactless access device about the enablement state of the payment instrument. When the payment instrument is enabled for gesture-controlled transaction, the user may make the predefined gesture to transmit the credentials to the contactless access device, and if the payment instrument is disabled for the gesture-controlled transaction, a contactless transaction may instead take place. The enablement and disablement state of the payment instrument for conducting gesture-controlled transactions may be determined by enabling or disabling "ACTIVE" state or "INACTIVE" state respectively on the payment instrument.

Provided are improved systems, devices, products, apparatus, and/or methods for performing a payment transaction using a contactless payment instrument that include a memory configured to store gesture data associated with one or more predefined gestures; a contactless chip configured to detect an operating field of an access device and establish a communication with the access device through a near-field communication protocol; a sensor configured to capture further gesture data associated with one or more gestures made by a user with the payment instrument in the operating field of the access device; a visual output component configured to provide a visual output to the user; and a processor programmed and/or configured to: compare the further gesture data associated with the one or more captured gestures to the gesture data associated with the one or more predefined gestures stored in the memory of the payment instrument to determine whether a captured gesture of the one or more captured gestures matches at least one of the one or more predefined gestures; in response to the captured gesture of the one or more captured gestures not matching a predefined gesture of the one or more predefined gestures stored in the memory of the payment instrument, increment a counter; and control, based on a current count of the counter, the visual output component of the payment instrument to provide the visual output to the user.

In this way, non-limiting embodiments or aspects of the present disclosure may provide a payment instrument that automatically tracks the gesture enablement state and a status of gesture authentication attempts, and for which a user is able to visually identify the gesture enablement state and the status of gesture authentication attempts.

Referring now to FIG. 1A, FIG. 1A is a diagram of an example environment 100 in which devices, systems, methods, and/or products described herein, may be implemented. As shown in FIG. 1A, environment 100 may include transaction processing network 101, which may include merchant system 102, payment gateway system 104, acquirer system 106, transaction service provider system 108, issuer system 110, user device 112, payment instrument 114, and/or communication network 116. Transaction processing network 101, merchant system 102, payment gateway system 104, acquirer system 106, transaction service provider system 108, issuer system 110, user device 112, and/or payment instrument 114 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, user device 112, and/or payment instrument 114 via communication network 116 and/or communicating information and/or data to payment gateway system 104, acquirer system 106, transaction service provider system 108, issuer system 110, user device 112, and/or payment instrument 114 via communication network 116. Merchant system 102 may include a device capable of receiving information and/or data from user device 112 and/or payment instrument 114 via a short range wireless communication connection (e.g., an NFC communication connection, an RFID communication connection, a Bluetooth® communication connection, etc.) with user device 112 and/or payment instrument 114 (e.g., contactless chip 154, etc.), and/or communicating information and/or data to user device 112 and/or payment instrument 114 e.g., contactless chip 154, etc.) via a short range wireless communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, and referring also to FIG. 1B, merchant system 102 may include access device 158 (e.g., a POS device, etc.).

Payment gateway system 104 may include one or more devices capable of receiving information and/or data from merchant system 102, acquirer system 106, transaction service provider system 108, issuer system 110, user device 112, and/or payment instrument 114 via communication network 116 and/or communicating information and/or data to merchant system 102, acquirer system 106, transaction service provider system 108, issuer system 110, user device 112, and/or payment instrument 114 via communication network 116. For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, user device 112, and/or payment instrument 114 via communication network 116 and/or communicating information and/or data to merchant system 102, payment gateway system 104, transaction service provider system 108, issuer system 110, user device 112, and/or payment instrument 114 via communication network 116. For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, user device 112, and/or payment instrument 114 via communication network 116 and/or communicating information and/or data to merchant system 102, payment gateway system 104, acquirer system 106, issuer system 110, user device 112, and/or payment instrument 114 via communication network 116. For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider system 108 may include and/or access one or more internal and/or external databases including transaction data.

Issuer system 110 may include one or more devices capable of receiving information and/or data from merchant system 102, payment gateway system 104, acquirer system 106, transaction service provider system 108, user device 112, and/or payment instrument 114 via communication network 116 and/or communicating information and/or data to merchant system 102, payment gateway system 104, acquirer system 106, transaction service provider system 108, user device 112, and/or payment instrument 114 via communication network 116. For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, issuer system 110, and/or payment instrument 114 via communication network 116 and/or communicating information and/or data to merchant system 102, payment gateway system 104, acquirer system 106, transaction service provider system 108, issuer system 110, and/or payment instrument 114 via communication network 116. For example, user device 112 may include a client device and/or the like. In some non-limiting embodiments or aspects, user device 112 may be capable of receiving information (e.g., from merchant system 102, from payment instrument 114, etc.) via a short range wireless communication connection (e.g., an NFC communication connection, an RFID communication connection, a Bluetooth® communication connection, and/or the like), and/or communicating information (e.g., to merchant system 102, to payment instrument 114, etc.) via a short range wireless communication connection.

In some non-limiting embodiments or aspects, user device 112 may include one or more applications associated with user device 112, such as an application stored, installed, and/or executed on user device 112 (e.g., a mobile device application, a native application for a mobile device, a mobile cloud application for a mobile device, an electronic wallet application, a peer-to-peer payment transfer application, a merchant application, an issuer application, a third-party application, etc.).

Payment instrument 114 may include a payment device or portable financial device capable of storing and providing payment credentials for a transaction. For example, payment instrument 114 may be configured to store and transmit payment credentials used in EMV (Europay, Mastercard and Visa) chip format for carrying out a transaction at an offline store. In some non-limiting embodiments or aspects, payment instrument 114 may be capable of receiving information (e.g., from merchant system 102, from access device 158, from user device 112, etc.) via a short range wireless communication connection (e.g., an NFC communication connection, an RFID communication connection, a Bluetooth® communication connection, and/or the like), and/or communicating information (e.g., to merchant system 102, to access device 158, to user device 112, etc.) via a short range wireless communication connection.

Communication network 116 may include one or more wired and/or wireless networks. For example, communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
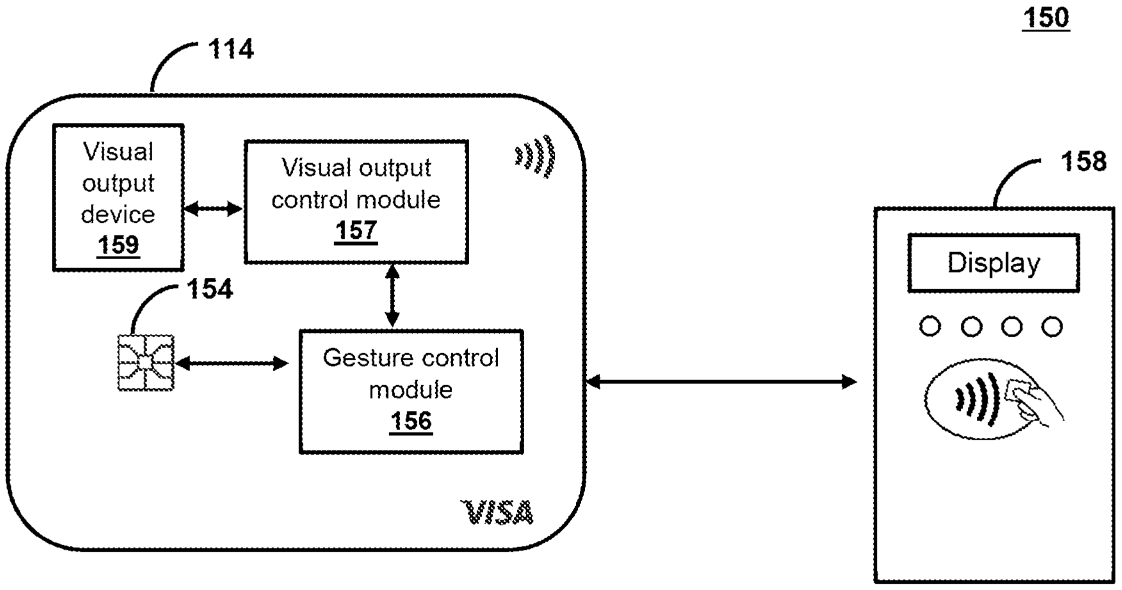
FIG. 1B is a diagram of non-limiting embodiments or aspects of a system for performing a contactless transaction.

Referring now to FIG. 1B, FIG. 1B is a diagram of non-limiting embodiments or aspects of a system 150 for performing a contactless transaction. As shown in FIG. 1B, system 150 may include payment instrument 114 and/or access device 158 (e.g., a POS device, etc.). Payment instrument 114 may include contactless chip 154, gesture control module 156, visual output control module 157, and/or visual output device 159. Contactless chip 154, gesture control module 156, visual output control module 157, and/or visual output device 159 may be embedded on payment instrument 114 and/or may be communicatively and/or electrically coupled with each other. For example, payment instrument 114 may include a consumer payment device associated with a user and/or issued by an issuer for enabling the user to make transactions at offline and online stores. Examples of offline stores may include a retail store, a ticketing counter, a gas station, a parking terminal, a toll booth, and/or the like, at which each of the user (e.g., a cardholder, etc.) and payment instrument 114 (e.g., a credit card, etc.) is present for a payment transaction and the payment transaction takes place in presence of the user, payment instrument 114, and/or access device 158 (e.g., POS device, etc.). Examples of online stores may include e-commerce, m-commerce web portals, virtual stores, and/or the like, at which a payment transaction takes place without the presence of the user, payment instrument 114, and/or access device 158 at a location, such as a brick and mortar store, and/or the like.

Non-limiting embodiments or aspects of the present disclosure may be useful in a card present scenario. A card present scenario may include a situation in which each of the user and payment instrument 114 are present and used for conducting a payment transaction. For example, the user may conduct contactless payments on access device 158 using one or more predefined gestures with payment instrument 114. As an example, contactless chip 154 may include a NFC chip that is configured to store and transmit payment credentials (e.g., a PAN, etc.) associated with the user in EMV (Europay, MasterCard and Visa) chip format for carrying out a payment transaction at an offline store. For example, contactless chip 154 may be used to conduct contactless transactions using one or more NFC communication protocols. In such an example, and as described herein in more detail below with respect to FIG. 1C, gesture control module 156 may include sensor module 166 including one or more of the following electronic components and/or sensors: an accelerometer, a gyroscope, a magnetometer, a pressure sensor, an altimeter, or any combination thereof, which may be configured to register, capture, recognize, and/or store gestures performed by the user with payment instrument 114 in an operating field of access device 158. For example, sensor module 166 may capture gestures made by the user with payment instrument 114 in the operating field of access device 158 for conducting a payment transaction.

Access device 158 may include an active electronic device (e.g., a POS device, etc.) capable of receiving signals from payment instrument 114 to process payment transactions. Access device 158 may be configured to broadcast a unique identifier which enables payment instrument 114 (e.g., via contactless chip 154, etc.) to detect access device 158 and/or establish a secure communication link with access device 158 through a contactless and secure NFC protocol. Access device 158 may be configured to conduct payment transactions with payment instrument 114 using the secure communication link. For example, access device 158 may include an active electronic device that generates an electromagnetic operating field when powered with electricity. This electromagnetic operating field may be used for initiating contactless transactions with contactless payment instrument 114. A range of the operating field generated by access device 158 may be governed by one or more contactless payment standards. In some non-limiting embodiments or aspects, access device 158 is capable of accepting contact transactions by swiping or dipping payment instrument 114 inside a dedicated slot of access device 158. Access device 158, apart from communicating with contactless cards, may perform various other functions, such as displaying messages to the user, displaying messages to the merchant, accepting merchant data entry of a transaction amount, user (e.g., cardholder, etc.) verification, provision of online connections, provision of data capture for clearing and settlement, and/or the like.

Access device 158 may be operational by using an operating system. Access device 158 may be loaded with one or more access device reader applications configured for pre-processing, discovery, and/or selection of payment instrument 114. For example, an access device reader application may include an Entry Point Software, which may be configured for reading EMV chip data and/or may be loaded on and/or executed by access device 158. The access device reader application may be configured for activation of an appropriate kernel of access device 158, handling outcomes returned to the kernel, including passing selected outcomes to be displayed on access device 158, and/or the like. In some non-limiting embodiments or aspects, access device 158 includes a kernel software configured for processing contactless transactions. For example, the access device reader application may be configured/programmed to select the kernel based on one or more predefined characteristics and/or transaction parameters of a payment transaction.

In some non-limiting embodiments or aspects, access device 158 is coupled with a merchant's computers (e.g., one or more devices of merchant system 102, etc.) for processing transactions. In some non-limiting embodiments or aspects, merchant system 102 is configured to transmit an authorization request message to acquirer system 106. Acquirer system 106 may receive an authorization request message from merchant system 102 and transmit the authorization request message to a payment platform (e.g., transaction service provider system 108, etc.). For example, a payment platform, such as VisaNet™, and/or the like, may be configured to receive the authorization request message and route the message and/or payment transaction to issuer system 110 for debiting a transaction amount associated with the payment transaction from a user account associated with payment instrument 114. As an example, the payment platform may act as a network that connects the merchant's account with the user's account. An authorizing entity, such as issuer system 110, and/or the like, may be configured to approve or deny the payment transaction carried out by the user's payment instrument based on one or more attributes or parameters associated with the payment transaction. The approval or the rejection status may be transmitted as an authorization response message by issuer system 110 to the payment platform. The payment platform may transmit the authorization response message to acquirer system 106, which may be configured to update or forward the authorization response message to merchant system 102, which may subsequently display the approval or rejection status associated therewith on access device 158. After the payment status is displayed on access device 158, the user can proceed with further steps associated with the transaction such as picking up goods, receiving services, and/or the like.

A transaction initiated by the payment instrument 114 including gesture control module 156 may modify this transaction process. For example, when payment instrument 114 is in the operating field of access device 158, access device 158 may first transmit a transaction initiation signal, and in response thereto, receive initial information from payment instrument 114. As an example, payment instrument 114 may transmit the initial information to access device 158 in response to receiving a transaction initiation instruction encoded in the transaction initiation signal. The initial information provided by payment instrument 114 may include a gesture enablement state. The gesture enablement state may be interpreted by the access device 158 by decoding the initial information transmitted by payment instrument 114. The initial information associated with the gesture enablement state may be transmitted as a single bit data field decodable by access device 158. For example, the gesture enablement state may include a flag set in memory (e.g., in memory module 168, etc.) and/or in an available field on contactless chip 154 of payment instrument 114 (and/or in the initial information received by access device 158). The flag may be interpretable by access device 158 using the reader application. The gesture enablement state may include one of "ACTIVE" state or "INACTIVE" state. The gesture enablement state may represent a gesture lock status of payment instrument 114. For example, if the gesture enablement state is "ACTIVE" state, the user may conduct a gesture-based authentication using payment instrument 114, and only after the authentication is successful, may payment instrument 114 be configured to transmit payment information (e.g., a PAN, etc.) to access device 158. As an example, if the gesture enablement state is "INACTIVE" state, the user may not conduct a gesture-based authentication using payment instrument 114, and payment instrument 114 may be configured to transmit payment information (e.g., a PAN, etc.) to access device 158 without the user performing the gesture-based authentication.

If payment instrument 114 is enabled for gesture-based authentication or operation, for example, as specified by the gesture enablement state, access device 158 may be programmed and/or configured to display a prompt to authenticate the transaction using gesture control on access device 158. After the prompt is displayed on access device 158, the user may perform one or more predefined gestures with payment instrument 114 in the operating field of access device 158 to authenticate the transaction within a preconfigured time-frame. For example, gesture control module 156 of payment instrument 114 may capture or detect the user's gesture with payment instrument 114 in the operating field of access device 158 using one or more sensors and/or decode the captured or detected gesture into machine-readable code. These machine-readable codes representing the captured or detected gesture may be compared with previously stored gestures stored in memory module 168 in the form of machine-readable code, and if the captured gesture matches a previously stored gesture, payment credentials (e.g., a PAN, etc.) associated with payment instrument 114 may be transmitted to access device 158 by contactless chip 154. However, if the gesture control module 156 fails to capture or detect a gesture with payment instrument 114 in the operating field of access device 158 that matches a previously stored gesture, payment instrument 114 may be configured not to transmit any payment credentials to access device 158 and/or to transmit an error signal to access device 158, which may be displayed on the display screen of access device 158.

In some non-limiting embodiments or aspects, the user initially configures the gesture enablement state for payment instrument 114. For example, the user may configure the gesture enablement state for payment instrument 114 by registering payment instrument 114 on a third-party application, such as a web application and/or a mobile application of issuer system 110 and/or the payment platform of the merchant, thereby enabling payment instrument 114 for gesture-controlled authentication. Further, when enabling the gesture-controlled authentication on payment instrument 114 using the third-party application, the user may have an option to configure payment instrument 114 to authenticate the contactless payment transaction by selecting one or more predefined gestures and/or creating a custom predefined gesture. For example, predefined gestures may include any known patterns for moving payment instrument 114 in the operating field of access device 158, such as moving payment instrument 114 in a clockwise direction, tapping payment instrument 114 a predetermined number of times on access device 158, and/or any other similar type of motion or movement of payment instrument 114 that may be detectable by gesture control module 156 with payment instrument 114 in the operating field of access device 158. In such an example, predefined gestures may be selected by the user via a user interface of the third-party application.

For a case of custom gesture control, the user may choose to define a custom gesture at access device 158. For example, the user may define the custom gesture for authenticating the transaction to be flipping payment instrument 114 and/or rotating payment instrument 114 in anti-clockwise direction, and/or any other similar type of motion or movement of the payment instrument 114 that may be captured and stored by gesture control module 156. The gestures selected or defined by the user may be recognized by gesture control module 156 of payment instrument 114 to enable a payment transaction to be processed at access device 158. The same procedure for resetting or updating the predefined gestures stored in memory may be followed, where the user may log into the web portal or mobile application and select appropriate options for updating and/or resetting the predefined gestures. In such an example, the user may authenticate themselves with the application before setting and/or resetting the predefined gestures of payment instrument 114 to avoid fraud and/or misuse of payment instrument 114. The user may be authenticated by the application through a registered identity, such as a registered phone number, a registered e-mail ID, and/or through any other authentication means, such as biometric authentication, PIN authentication, and/or the like. In some non-limiting embodiments or aspects, only after the user is authenticated is the user allowed to activate, set, define, reset, and/or inactivate the predefined gestures. In some non-limiting embodiments or aspects, the one or more selected and/or custom predefined gestures may be stored (e.g., in machine readable code, etc.) on payment instrument 114 as a stored gesture (e.g., in memory module 168, in contactless chip 154, etc.). A stored gesture may include a gesture that the user may use to approve or authenticate a transaction when the gesture enablement state flag is set to ACTIVE in payment instrument 114.

Visual output control module 157 may count a number of incorrect gesture authentication attempts performed by the user against a predetermined threshold count and control visual output device 159 based on the gesture enablement state and/or the gesture authentication attempts to provide a visual output that indicates the gesture enablement state and/or the current count of gesture authentication attempts. For example, visual output control module 157 may store in memory (e.g., in memory module 168, in contactless chip 154, etc.) the predetermined threshold count (e.g., a maximum number of allowed incorrect or wrong gesture authentication attempts—which can be configured at a card manufacture phase and/or by the user via the third-party application—that can be made by the user in trying to authenticate the transaction via gesture when the gesture enablement state is ACTIVE before payment instrument 114 is locked or prevent from being used for further payment transactions, etc.) and/or a current count of a counter incremented in response to a captured gesture not matching a predefined gesture stored in the memory of payment instrument 114 (e.g., an actual number of incorrect or wrong gesture attempts—which may be 0 initially and/or may be incremented by 1 in response to each failed attempt at gesture authentication using payment instrument 114, etc.).

Visual output device or component 159 may include one or more devices capable of providing a visual output to a user. For example, visual output device or component 159 may include at least one of the following: a light-emitting diode (LED) (e.g., a multicolor LED, etc.), a display (e.g., e.g., an e-ink display, a lower power LCD display, etc.), or combination thereof. As an example, visual output control module 157 may control, based on the gesture enablement state and/or the current count of the counter, visual output device or component 159 to provide a visual output to the user representing the gesture enablement state and/or the current number of incorrect gesture authentication attempts. Further details regarding non-limiting embodiments or aspects of visual output control module 157, visual output device or component 159, and other components and functions of payment instrument 114 are provided herein below with respect to FIGS. 1C, 3A, and 3B.

Figure 1C:
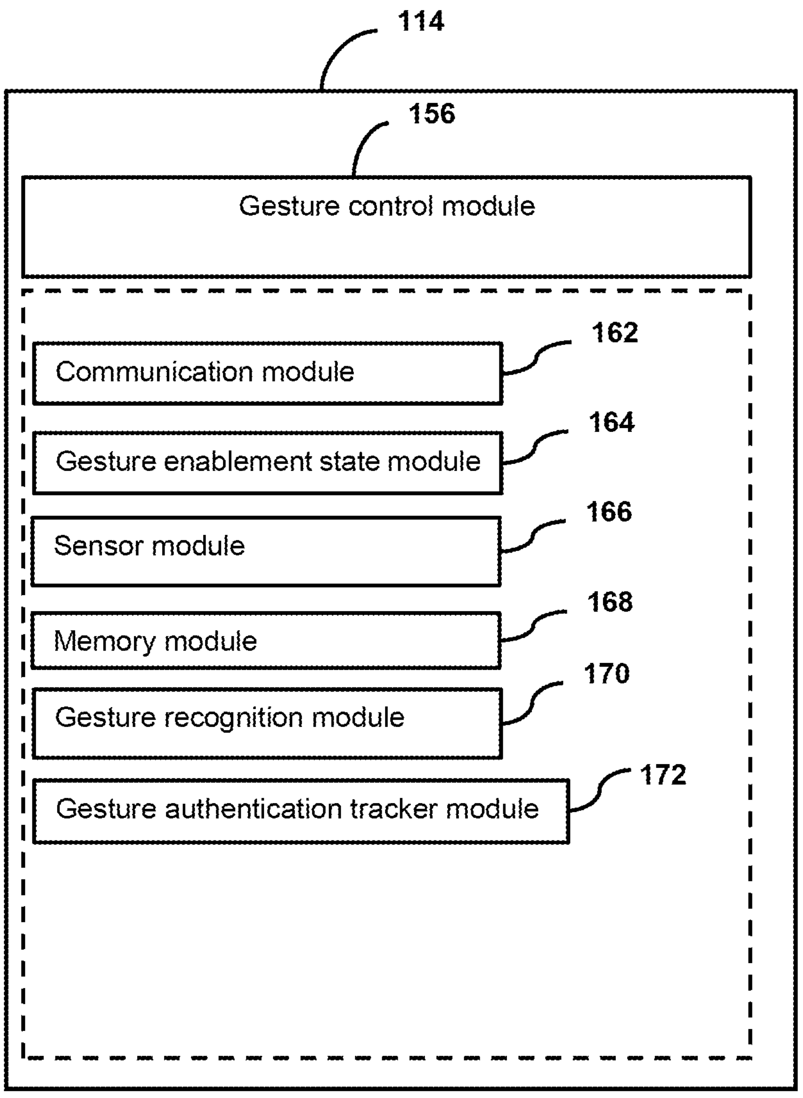
FIG. 1C is a diagram of non-limiting embodiments or aspects of a gesture control module of a payment instrument of FIG. 1B.

Referring now to FIG. 1C, FIG. 1C is a diagram of non-limiting embodiments or aspects of gesture control module 156 in payment instrument 114 of FIG. 1B. As shown in FIG. 1C, gesture control module 156 may include one or more submodules including, but not limited to, the following: communication module 162, gesture enablement state module 164, sensor module 166, memory module 168, gesture recognition module 170, and/or gesture authentication tracker module 172. In some non-limiting embodiments or aspects, one or more aspects or functions of visual output control module 157 may be implemented within and/or performed by gesture control module 156 (e.g., by gesture authentication tracker module 172, etc.).

Communication module 162 may be configured to communicate with contactless chip 154 in payment instrument 114 and/or with each of the other submodules in gesture control module 156 and/or visual output control module

157. Communication module 162 may communicate with the other modules and/or contactless chip 154 using one or more communication protocols including wired and/or wireless communication protocols. Examples of such communication protocols may include, but are not limited to, the following: Point-to-Point Protocol (PPP), Transmission Control Protocol (TCP), Internet Protocol (IP), File Transfer Protocol (FTP), Hyper Text Transfer Protocol (HTTP), Serial Line Internet Protocol (SLIP), and/or the like.

Gesture enablement state module 164 may be configured to communicate with contactless chip of payment instrument 114 regarding the gesture enablement state of payment instrument 114. For example, gesture control module 156 may communicate with contactless chip 154 only when payment instrument 114 is in the operating field of access device 158. Communications from gesture control module 156 may be stored in an available storage field on contactless chip 154 and/or in memory module 168 of payment instrument 114. Gesture enablement state module 164 may be configured to provide the gesture enablement state of payment instrument 114 to access device 158. For example, the gesture enablement state may be either one of "ACTIVE" state or "INACTIVE" state. The gesture enablement state transmitted from payment instrument 114 to access device 158 may enable the access device 158 to determine if the payment instrument 114 can be used to conduct the payment transaction with or without using gesture-based authentication. If the gesture enablement state is "ACTIVE" state, gesture based authentication may be used when the payment instrument 114 is used for conducting the payment transaction in a card-present scenario. If the gesture enablement state is "INACTIVE" state, the user of the payment instrument 114 need not authenticate the transaction using gesture based control.

The gesture enablement state of gesture enablement state module 164 may be set by the user using a third-party application, such a web application and/or a mobile application provided by an issuer, a payment platform, and/or the merchant. The user may select "ACTIVE" state or "INACTIVE" state using the user interface provided by the third-party application. The gesture enablement state may be communicated to payment instrument 114 from the payment platform (e.g., VisaNet™, etc.) when the payment instrument 114 is connected to the payment platform (e.g., via access device 158, via user device 112, etc.). The communication from the payment platform to the payment instrument 114 may use one or more communication networks using one or more reliable and secure communication protocols.

Sensor module 166 may include one or more electronic devices/components that aid the gesture control made by the user for authenticating the contactless transaction. Sensor module 166 may include one or more of the following sensors: an accelerometer, a gyroscope, a magnetometer, a pressure or force sensor, an altimeter, or any combination thereof. For example, electronic components and/or sensors in sensor module 166 may include hardware electronic devices that are passive in nature and work (e.g., are powered up, operate, etc.) only when the devices/sensors are in the operating field of access device 158. The one or more sensors in sensor module 166 may be used to capture the gestures made by the user with payment instrument 114 in the operating field of access device 158 to authenticate a payment transaction.

In some non-limiting embodiments or aspects, sensor module 166 includes an accelerometer that captures or measures a tilting motion and/or an orientation of the payment instrument 114 in the operating field of the access device 158. For example, a predefined gesture may be associated with a predetermined tilting motion and/or orientation of payment instrument 114. In some non-limiting embodiments or aspects, sensor module 166 includes a gyroscope that captures or measures a rotation and/or a twist of payment instrument 114 in the operating field of access device 158. For example, a predefined gesture may be associated with a predetermined rotation and/or twist of payment instrument 114. In some non-limiting embodiments or aspects, sensor module 166 includes a magnetometer that captures or measures a strength and/or a direction of a magnetic field of access device 158 and/or the Earth's magnetic field relative to payment instrument 114 when payment instrument 114 is in the operating field of the access device 158. For example, a predefined gesture may be associated with a predetermined strength and/or a predetermined direction of a magnetic field (e.g., indicating a distance, a location, and/or an orientation of payment instrument 114 relative to access device 158 and/or to the Earth's magnetic field, etc.). In some non-limiting embodiments or aspects, sensor module 166 includes a pressure or force sensor that captures or measures a pressure or force applied to payment instrument 114 when payment instrument 114 is in the operating field of the access device. For example, a predefined gesture may be associated with applying a predetermined amount of pressure or force to payment instrument 114. In some non-limiting embodiments or aspects, sensor module 166 includes an altimeter that captures or measures an altitude of payment instrument above sea level. For example, a predefined gesture may be associated with a predetermined change in altitude of payment instrument 114.

Captured gesture data may be processed by sensor module 166 and/or processed in an external component, such as gesture recognition module 170, and/or the like. The sensors and/or the electronic components in sensor module 166 may be embedded on payment instrument 114. In some non-limiting embodiments or aspects, sensor module 166 may include additional, or alternative, sensors, such as proximity sensors for determining a distance between objects (e.g., the proximity of the user and/or the proximity of the access device 158 to payment instrument 114, etc.) and/or a magnetometer for determining an orientation of payment instrument 114 in relation to the Earth's magnetic field. In some non-limiting embodiments or aspects, sensors in sensor module 166 may be integrated with and embedded on the payment instrument 114.

Gesture recognition module 170 may receive, detect, and/or process the gestures made by the user with the payment instrument 114 in the operating field of access device 158. Gesture recognition module 170 may include hardware and/or software components that may capture and/or recognize the gestures made by the user using one or more gesture recognition techniques. Gesture recognition module 170 may compare the stored predefined gesture with a gesture made by a user at a time of a payment transaction in the operating field of the access device 158. Gesture recognition module 170 may determine (e.g., in real-time, while the payment instrument 114 is in the operating field of the access device 158, etc.) whether the capture or detected gesture matches a stored gesture or not. A status of the matching determined by the gesture recognition module 170 may include an authentication status (e.g., a match=authorize, no match=deny, etc.), and payment instrument 114 may transmit the determined authentication status to access device 158.

Memory module 168 may be configured to store predefined gestures used by gesture recognition module 170 to compare to the gesture made by the user at a time of a payment transaction in the operating field of access device 158. For example, memory module 168 may include access memory modules used for functioning of gesture control module 156. Examples of access memory in memory module 168 may include, but are not limited to, the following: random access memory (RAM), static random access memory (SRAM), cache memory, and/or the like. Components of gesture control module 156 and/or visual output control module 157 may be integrated and embedded as a single module, or may be embedded as separate components and linked through appropriate communication protocols. However, these components may function as a single gesture control module 156 and/or communicate with contactless chip 154 of payment instrument 114 in unison.

If memory module 168 does not include any predefined gestures, the memory used for storing the predefined gestures may be in a null state. When the user desires to enable the gesture control of payment instrument 114, the user may login to a web-portal and/or a mobile application (e.g., via user device 112, etc.) and select an appropriate option to enable the gesture control. The selected option (e.g., "ACTIVE" state or "INACTIVE" state, etc.) may be updated through a communication network to the payment platform, and the payment platform may enable the selected option for the user when the payment instrument 114 is next used (e.g., when the payment instrument is next in an operating field of the access device 158 and/or an external device executing the application, such as user device 112, and/or the like, etc.). If the user selects one of the predefined options for authenticating the contactless transaction through gesture control, the option may be updated to the payment platform and the user may use this option for a next payment transaction at access device 158. For example, if the user selects a predefined standard gesture option provided on the web portal and/or the mobile application to authenticate a payment transaction by rotating the payment instrument 114 in a clockwise direction, the user may authenticate the next transaction by doing so in the operating field of access device 158 when conducting the next transaction. As an example, predefined gestures may have a machine-readable code and/or the payment platform may be configured to fetch the code and update the payment instrument 114 with the machine-readable code for the pre-defined gestures when the payment instrument 114 is in the operating field of the access device 158 and/or the external device (e.g., user device 112 executing the application, etc.), which may be enabled by configuring access device 158 to communicate with contactless chip 154, which may in-turn communicate with memory module 168 to update the memory for storing the selected predefined standard gesture. In this way, in response to the user making the selected predefined standard gesture in the operating field of access device 158, gesture recognition module 170 may be configured to capture the gesture and compare the captured gesture with the predefined gesture(s) stored in memory module 168. Gesture recognition module 170 may be configured to determine an authentication status for a payment transaction based on whether a captured gesture matches at least one of the one or more predefined gestures and/or communicate the authentication status to contactless chip 154 of the payment instrument 114 for transmission to the access device 158.

If the user chooses to define a custom gesture for authenticating the contactless transaction, the user may generate and/or register the custom gesture, which may be stored in memory module 168 of gesture control module 156, by using the third-party application to generate a custom gesture that is registered and stored on payment instrument 114 when the payment instrument is in an operating field of access device 158 and/or user device 112. For example, information or code associated with the custom gesture may be updated to the payment platform, and the payment platform may communicate the information to the user through the display of access device 158. If the user brings payment instrument 114 in the operating field of the access device 158, a prompt may be provided on the display to register the custom gesture. The user may register the custom gesture by accepting the prompt, and the custom gesture may be captured and/or recorded by sensor module 166. Sensor module 166 may be configured to communicate with gesture recognition module 170 and memory module 168 for storing the gesture and/or enabling the user to make gesture-controlled authentication while performing contactless transactions using payment instrument 114. If the user intends to activate, reset, and/or inactivate the gesture enablement state of payment instrument 114, the user may be authenticated. The user may be authenticated by identifying themselves using a registered and trusted identity, such as a registered phone number, inputting a PIN, a password, a biometric authentication, and/or the like. After the user is authenticated, access device 158 and/or user device 112 may enable the user to carry on further activities with payment instrument 114 in the operating field, such as setting the gesture enablement state to "ACTIVE" state, setting the gesture enablement state to "INACTIVE" state, and/or resetting the custom gesture, resetting a failed attempts counter, and/or the like.

In some non-limiting embodiments or aspects, a status of matching a captured gesture determined by gesture recognition module 170 may be used to determine an authentication status of the user. For example, the authentication status may be determined in real-time by gesture recognition module 170. The authentication status may be either "SUCCESS" state or "FAILURE" state. The authentication status may be computed as "SUCCESS" state, if the gesture recognition module 170 computes a match between the gesture made by the user at the time of the transaction with the predefined gesture, and the "FAILURE" state when the gesture recognition module 170 computes a no-match between the gesture made by the user at the time of the transaction with the predefined gesture(s). In some non-limiting embodiments or aspects of the present disclosure, the authentication status may be provided as a confidence score. The confidence score may be determined based on a match density of the captured gesture and the stored gesture. The match density for determining the confidence score may be preconfigured at the time of registration. For example, when the captured gesture and the stored gesture have a match density of 60%, the confidence score may be computed as "6" and when the captured gesture and the stored gesture has a match density of 10%, the confidence score may be computed as "1". The computed confidence scores may be mapped with the authentication status. In some non-limiting embodiments or aspects, when the confidence score is in the range of 6-10; the authentication status may be provided as "SUCCESS" and when the confidence score is below 5, then the authentication status may be provided as "FAILURE." After the authentication status is determined, gesture recognition module 170 may be configured to communicate the authentication status to contactless chip 154, which may in-turn communicate the authentication status to access device 158.

In some non-limiting embodiments or aspects, access device 158 may receive the authentication status, and based on the authentication status received, proceed for further actions. For example, the authentication status received by the access device 158 may be processed by the reader application and/or may be configured for processing further actions. In a scenario where the authentication status is received as "SUCCESS" state, access device 158 may be configured to receive credentials used for conducting the transaction from payment instrument 114. In a scenario where the authentication status is received as "FAILURE" state, access device 158 may be configured to display a message of the authentication failure on the display module of access device 158. Access device 158 may be configured to display one or more options that a merchant and/or a user may take to complete the payment transaction. The one or more options may include, but are not limited to, the following: retrying the gesture based authentication, conducting a contact authentication, accepting a cash transaction, and/or the like. The one or more options may be selected by the user and/or the merchant, and/or the actions may be processed further accordingly.

Gesture authentication tracker module 172 may perform one or more operations and/or functions of visual output control module 157, such as counting a number of incorrect gesture authentication attempts performed by the user against a predetermined threshold count, and/or the like. For example, gesture authentication tracker module 172 may store in memory (e.g., in memory module 168, in contactless chip 154, etc.) a predetermined threshold count (e.g., a maximum number of allowed incorrect or wrong gesture authentication attempts-which can be configured at a card manufacture phase and/or by the user via the third-party application—that can be made by the user in trying to authenticate the transaction via gesture when the gesture enablement state is ACTIVE before payment instrument 114 is locked or prevent from being used for further payment transactions, etc.) and/or a current count of a counter incremented in response to a captured gesture not matching a predefined gesture stored in the memory of payment instrument 114 (e.g., an actual number of incorrect or wrong gesture attempts-which may be 0 initially and/or may be incremented by 1 in response to each failed attempt at gesture authentication using payment instrument 114, etc.).

Figure 1D:
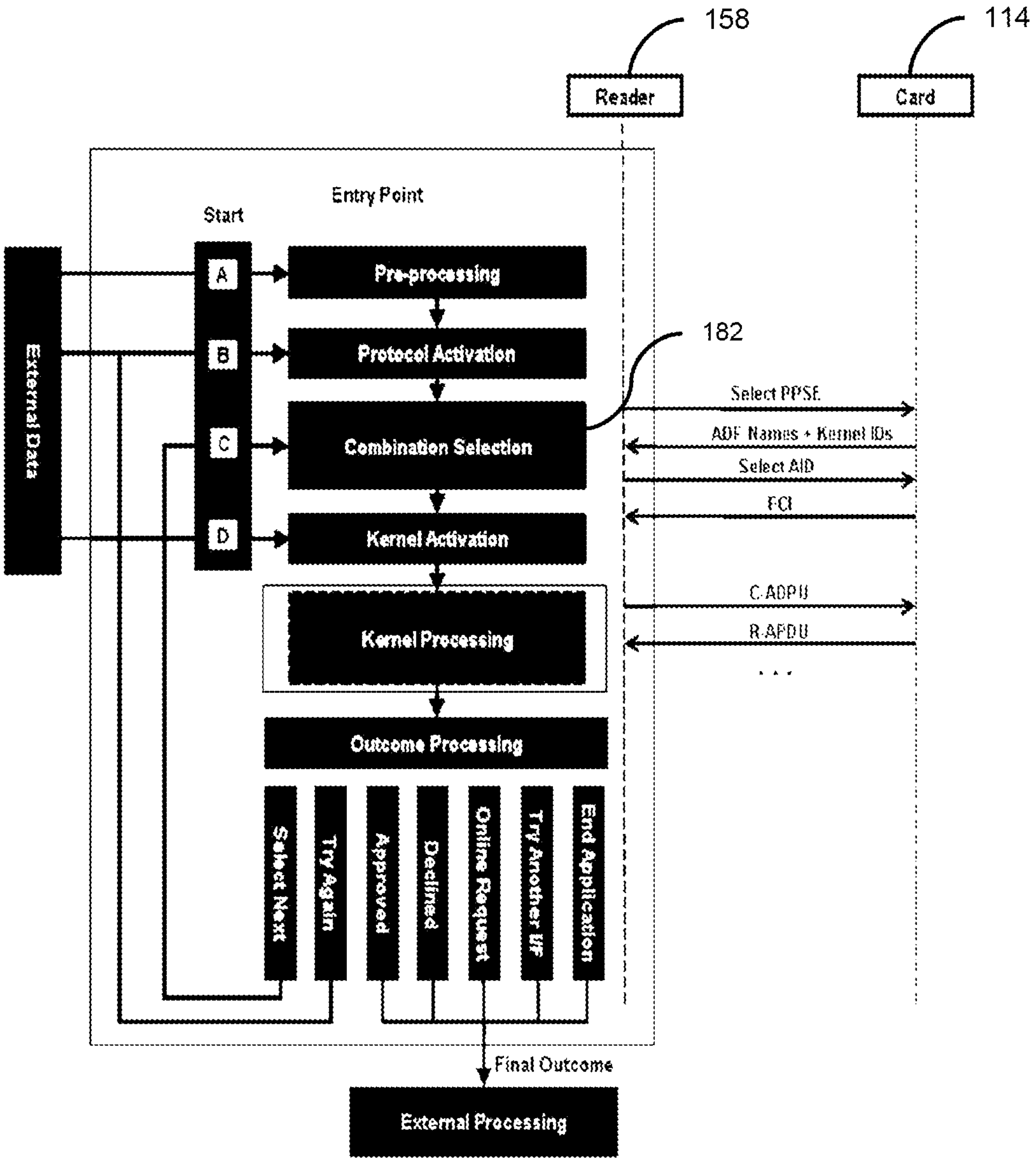
FIG. 1D is a diagram of non-limiting embodiments or aspects of a reader application of an access device.

Referring now to FIG. 1D, FIG. 1D is a diagram of non-limiting embodiments or aspects of a reader application of access device 158. As shown in FIG. 1D, access device software for a POS device (e.g., an Entry Point architecture provided by the EMVCo®, etc.) may include an enhancement in a "Combination Selection" module 182. As per the EMV® Specification (B_Entry_Point_Specification_v2_7_Final), access device 158 may be configured to send a SELECT command to payment instrument 114, and payment instrument 114 may be configured to check for the value of the gesture enablement state data element and/or the current count of the counter, and if the value of the gesture enablement state data element and/or the current count of the counter is:

a. 0 and/or satisfies a threshold count-payment instrument 114 may not transmit any payment information requested by access device 158 in response to the SELECT command;

b. 1 and fails to satisfy the threshold count-payment instrument 114 may respond to the SELECT command in the usual manner as the specifications in EMV_v4.3_Bok_1_ICC_to_Terminal_Interface, 11.3.)

In some non-limiting embodiments or aspects, payment instrument 114 may be configured to check for the ratio of failed gesture authentication attempts to a maximum number of allowed failed gesture attempts before checking for the gesture enablement state of payment instrument 114. For example, if payment instrument 114 (e.g., gesture authentication tracker module 172, etc.) determines that (Failed Gesture Authentication Attempts) % (Max. number of allowed failed gesture attempts)=1, payment instrument 114 may not check the gesture enablement state data element stored on payment instrument 114 and/or may automatically indicate to access device 158 (e.g., via a response to a SELECT command, etc.) to display a message to the user that the card has reached a maximum number of wrong or failed gesture attempts and should be reset via the configuration process described herein. For example, access device 158 may include a display that is configured to display messages for the merchant and/or the user at access device 158. For example, access device 158 may control the display to provide a message for the user of payment instrument 114 to authenticate a transaction at access device 158 using one or more predefined gestures. The message may be provided on the display after the reader application detects payment instrument 114 through the SELECT flag data transmitted by payment instrument 114. In response to display of the message on access device 158, the user may perform the predefined gestures in the operating field of access device 158, which may be recognized by gesture control module 156, and contactless chip 154 may transmit user credentials and/or payment information to the access device 158 for further processing of the transaction.

The number and arrangement of devices and systems shown in FIGS. 1A-1D is provided as an example. There may be additional devices and/or systems, fewer devices and/or systems, different devices and/or systems, or differently arranged devices and/or systems than those shown in FIGS. 1A-1D. Furthermore, two or more devices and/or systems shown in FIGS. 1A-1D may be implemented within a single device and/or system, or a single device and/or system shown in FIGS. 1A-1D may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
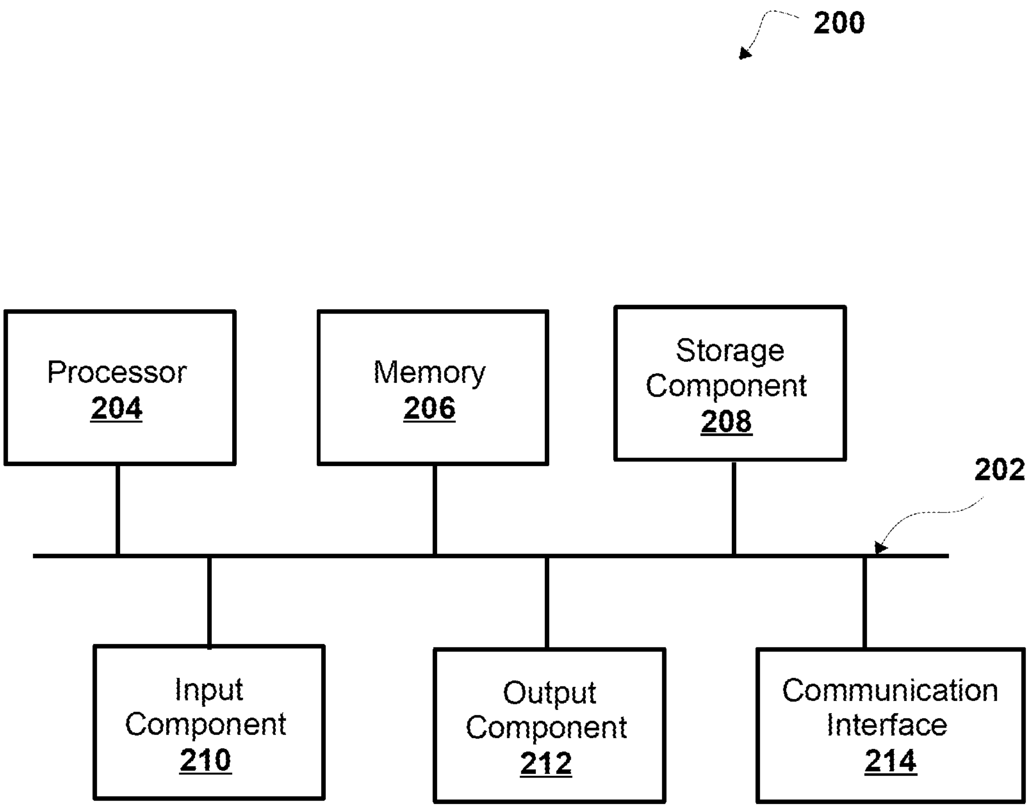
FIG. 2 is a diagram of non-limiting embodiments or aspects of components of one or more devices and/or one or more systems of FIGS. 1A-1D.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or payment instrument 114 (e.g., one or more devices of a system of payment instrument 114, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or payment instrument 114 (e.g., one or more devices of a system of payment instrument 114, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
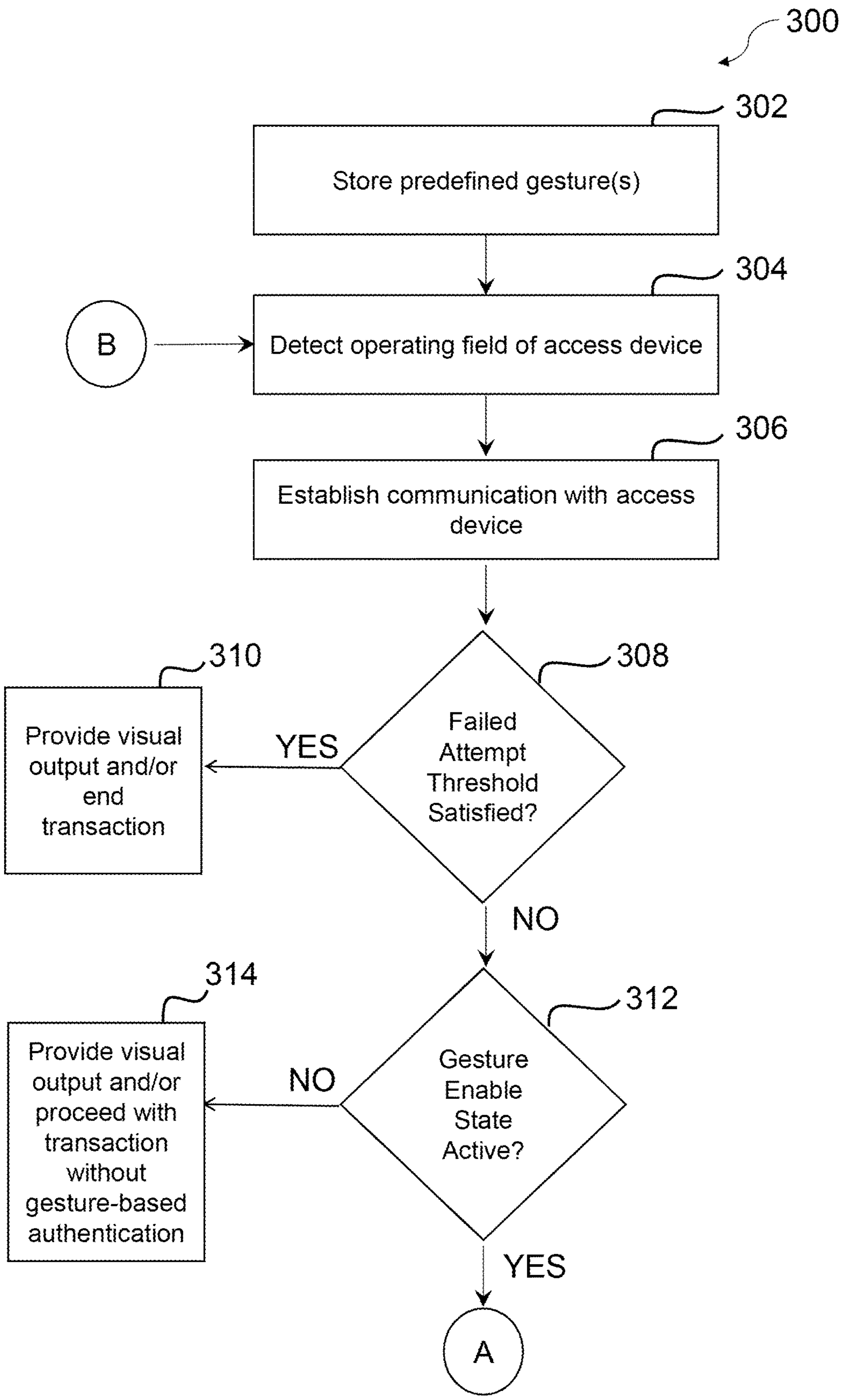
FIGS. 3A and 3B are a flowchart of non-limiting embodiments or aspects of a process for performing a contactless transaction.
Figure 3B:
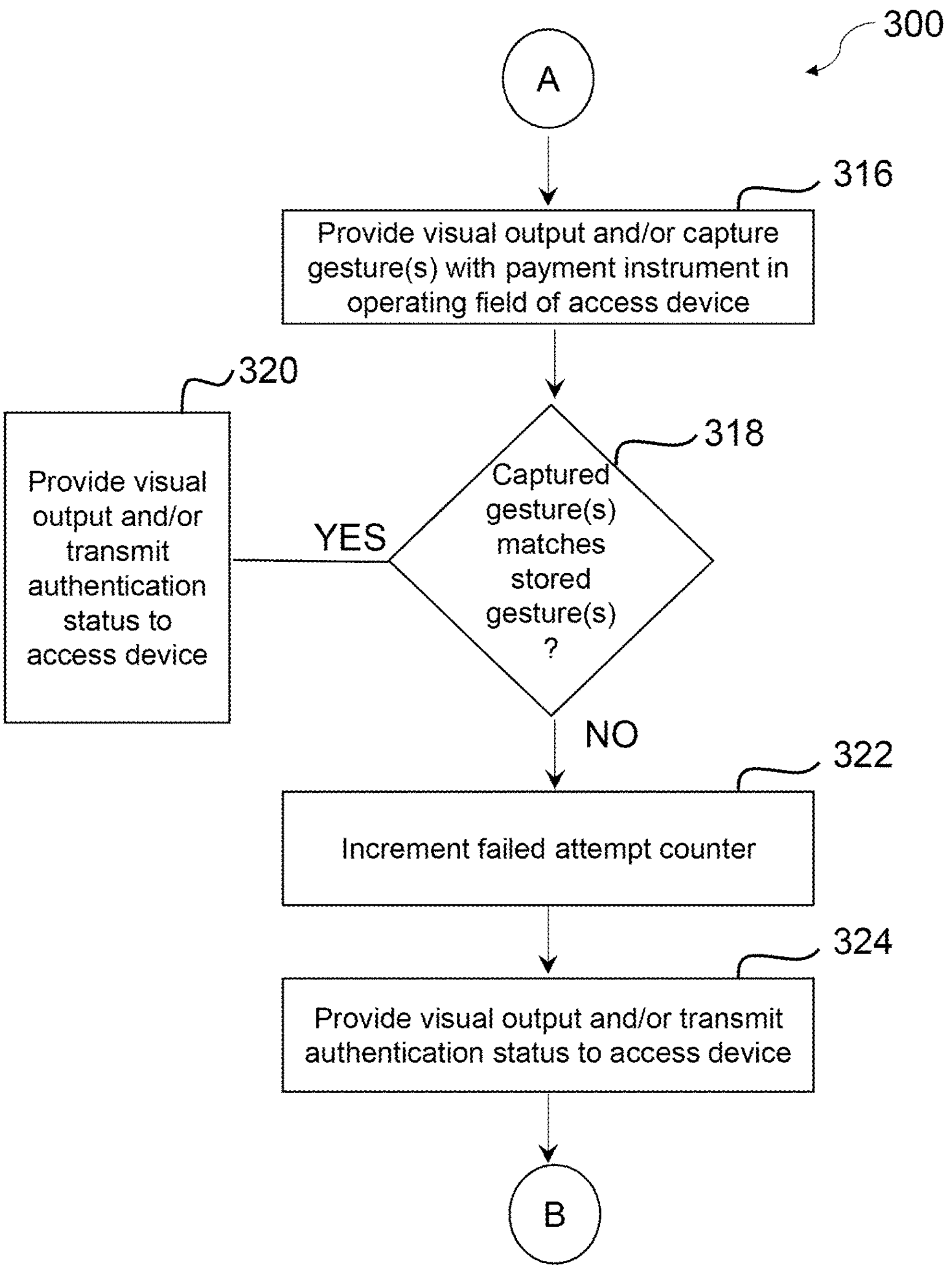

Referring now to FIGS. 3A and 3B, FIGS. 3A and 3B are a flowchart of non-limiting embodiments or aspects of a process 300 for performing a contactless transaction. In some non-limiting embodiments or aspects, one or more of the steps of process 300 may be performed (e.g., completely, partially, etc.) by payment instrument 114 (e.g., one or more devices of a system of payment instrument 114). In some non-limiting embodiments or aspects, one or more of the steps of process 300 may be performed (e.g., completely, partially, etc.) by another device or a group of devices separate from or including payment instrument 114, such as, access device 158 (e.g., one or more devices of a system of access device 158, etc.), merchant system 102 (e.g., one or more devices of merchant system 102), payment gateway system 104 (e.g., one or more devices of payment gateway system 104), acquirer system 106 (e.g., one or more devices of acquirer system 106), transaction service provider system 108 (e.g., one or more devices of transaction service provider system 108, etc.), issuer system 110 (e.g., one or more devices of issuer system 110), and/or user device 112.

As shown in FIG. 3A, at step 302, process 300 includes storing one or more predefined gestures. For example, payment instrument 114 may store one or more predefined gestures. As an example, payment instrument 114 may store, with a memory (e.g., memory module 168, contactless chip 154, etc.), gesture data associated with one or more predefined gestures. In such an example, gesture data may include machine-readable codes representing the one or more predefined gestures, which may include predefined gestures pre-loaded on payment instrument 114 and/or custom predefined gestures generated by a user and loaded on payment instrument 114.

As shown in FIG. 3A, at step 304, process 300 includes detecting an operating field of an access device. For example, payment instrument 114 may detect an operating field of access device 158. As an example, payment instrument 114 may detect, with contactless chip 154, an operating field of access device 158. In such an example, one or more components of payment instrument 114 described herein may be passive in nature and work (e.g., may be powered up, may operate, etc.) only when payment instrument 114 is in the operating field of access device 158 such that payment instrument 114 receives energy for powering the passive components from the operating field.

As shown in FIG. 3A, at step 306, process 300 includes establishing a communication with an access device. For example, payment instrument 114 may establish a communication with access device 158. As an example, payment instrument 114 may establish, with contactless chip 154, a communication (e.g., a communication session, a communication channel, etc.) with access device 158 through a near-field communication protocol.

As shown in FIG. 3A, at step 308, process 300 includes determining whether a failed attempt threshold is satisfied. For example, payment instrument 114 may determine whether a failed attempt threshold is satisfied. As an example, payment instrument 114 may store, in memory (e.g., memory module 168, contactless chip 154, etc.), a failed attempts state. In such an example, the failed attempts state may be determined based on a current count of a counter and a predetermined threshold count stored in the memory of payment instrument 114. For example, payment instrument 114 may determine whether the current count of the counter, which may be incremented in response to a failed gesture authentication attempt (e.g., in response to a captured gesture not matching a predefined gesture stored in the memory of payment instrument 114, etc.), satisfies a predetermined threshold count stored in the memory of payment instrument 114.

A predetermined threshold count associated with the failed attempts state of payment instrument 114 may be preconfigured in the memory of payment instrument 114 (e.g., during production, etc.) and/or set by a user (e.g., via the third-party application described herein, etc.). For example, the predetermined threshold count may include a number of failed gesture authentication attempts in response to which payment instrument 114 may be automatically locked and/or prevented from being used for conducting a payment transaction.

As shown in FIG. 3A, at step 310, process 300 includes, in response to determining that a failed attempt threshold is satisfied at step 308, providing a visual output and/or ending a transaction. For example, in response to determining that a failed attempt threshold is satisfied, payment instrument 114 may provide a visual output and/or end a transaction. As an example, in response to determining that the current count of the counter satisfies the predetermined threshold count stored in the memory of payment instrument 114, payment instrument 114 may provide a visual output associated with the failed attempts state (e.g., control visual output device 159 to provide a visual output associated with the failed attempts state, such as controlling a multicolor LED to emit a red light, and/or the like, etc.) and/or transmit, with contactless chip 154, the failed attempts state to access device 158 through the established near-field communication protocol. In such an example, receiving a failed attempts state indicating that the failed attempt threshold is satisfied may cause access device 158 to automatically cancel or deny the transaction and/or to provide a message associated with the failed attempts state to the user via the display of access device 158 (e.g., a message indicating that payment instrument 114 is locked, etc.).

As shown in FIG. 3A, at step 312, process 300 includes, in response to determining that a failed attempt threshold is not satisfied at step 308, determining whether a gesture enablement state is active. For example, in response to determining that a failed attempt threshold is not satisfied at step 308, payment instrument 114 may determine whether a gesture enablement state is active. As an example, in response to determining that the current count of the counter does not satisfy the predetermined threshold count stored in the memory of payment instrument 114, payment instrument 114 may determine whether the gesture enablement state (e.g., stored or set in the memory of payment instrument 114, etc.) is the "ACTIVE" state, in which the user may conduct a gesture-based authentication using payment instrument 114, or the "INACTIVE" state, in which the user may not conduct a gesture-based authentication using payment instrument 114. In such an example, payment instrument 114 may store, with the memory (e.g., memory module 168, contactless chip 154, etc.), the gesture enablement state, wherein the gesture enablement state is either of "ACTIVE" state or "INACTIVE" state, and/or payment instrument 114 may transmit with contactless chip 154, the gesture enablement state to access device 158 through the established near-field communication protocol.

As shown in FIG. 3A, at step 314, process 300 includes, in response to determining that the gesture enablement state is not active at step 312, providing a visual output and/or proceeding with a transaction without gesture-based authentication. For example, in response to determining that the gesture enablement state is not active at step 312, payment instrument 114 may provide a visual output and/or proceed with a transaction without gesture-based authentication. As an example, in response to determining that the gesture enablement state is in the "INACTIVE" state, in which the user may not conduct a gesture-based authentication using payment instrument 114, payment instrument 114 may provide a visual output associated with and/or based on the "INACTIVE" state (e.g., control visual output device 159 to provide a visual output associated with the "INACTIVE" state, such as controlling a multicolor LED to emit a magenta light, and/or the like, etc.) and/or proceed with the transaction without using gesture-based authentication (e.g., process the transactions in contact manner, such as by swiping or dipping payment instrument 114 inside a dedicated slot of access device 158, and/or the like, etc.)

As shown in FIG. 3B, at step 316, process 300 includes, in response to determining that the gesture enablement state is active at step 312, providing a visual output and/or capturing a gesture with a payment instrument in an operating field of an access device. For example, in response to determining that the gesture enablement state is active at step 312, payment instrument 114 may provide a visual output and/or capture a gesture with payment instrument 114 in an operating field of access device 158. As an example, in response to determining that the gesture enablement state is in the "ACTIVE" state, in which the user may conduct a gesture-based authentication using payment instrument 114, payment instrument 114 may provide a visual output associated with and/or based on the "ACTIVE" state (e.g., control visual output device 159 to provide a visual output associated with the "ACTIVE" state and/or a current count of the counter, such as controlling a multicolor LED to emit a green light representing a first count or attempt-to-threshold ratio (e.g., a count of 0 or a lowest ratio, etc.), a blue light representing a second count or attempt-to-threshold ratio (e.g., a count of 1 or a higher ratio than the first ratio, etc.), a yellow light representing a third count or attempt-to-threshold ratio (e.g. a count of 2 or a higher ratio than the first ratio and the second ratio, etc.), and/or the like, etc.) and/or capture, with a sensor of payment instrument 114, further gesture data associated with one or more gestures made by the user with payment instrument 114 in the operating field of access device 158.

As described previously herein, a sensor of payment instrument 114 may include at least one of the following sensors: an accelerometer, a gyroscope, a magnetometer, a pressure sensor, an altimeter, or any combination thereof. For example, payment instrument 114 may include an accelerometer that captures a tilting motion and/or an orientation of payment instrument 114 in the operating field of access device 158 as further gesture data associated with the one or more gestures made by the user with payment instrument 114 in the operating field of access device 158. As an example, payment instrument 114 may include a gyroscope that captures a rotation of payment instrument 114 made by the user with payment instrument 114 in the operating field of access device 158 as the further gesture data associated with the one or more gestures made by the user with payment instrument 114 in the operating field of access device 158.

As shown in FIG. 3B, at step 318, process 300 includes determining whether a captured gesture matches a predefined gesture. For example, payment instrument 114 may determine whether a captured gesture matches a predefined gesture. As an example, payment instrument 114 may compare the further gesture data associated with the one or more captured gestures to the gesture data associated with the one or more predefined gestures stored in the memory of payment instrument 114 (e.g., using a density matching technique, etc.) to determine whether a captured gesture of the one or more captured gestures matches at least one of the one or more predefined gestures.

As shown in FIG. 3B, at step 320, process 300 includes, in response to determining that a captured gesture matches a predefined gesture, providing a visual output and/or transmitting an authentication status to an access device. For example, in response to determining that a captured gesture matches a predefined gesture, payment instrument 114 may provide a visual output and/or transmitting an authentication status to an access device. As an example, in response to the captured gesture of the one or more captured gestures matching a predefined gesture of the one or more predefined gestures stored in the memory of payment instrument 114, payment instrument 114 may provide a visual output and/or transmit an authentication status to an access device. In such an example, payment instrument 114 may maintain the same visual output associated with the "ACTIVE" state and/or the current count of the counter provided in step 316, because payment instrument 114 may not increment the counter in response to determining that the captured gesture matches a predefined gesture stored in payment instrument 114. In such an example, payment instrument 114 may transmit, with contactless chip 154, to access device 158, an authentication status associated with the user. For example, the authentication status may be determined based on whether the captured gesture of the one or more captured gestures matches the at least one of the one or more predefined gestures. As an example, the authentication status may be provided as "SUCCESS" state in step 320 in response to the captured gesture of the one or more captured gestures matching a predefined gesture of the one or more predefined gestures stored in the memory of payment instrument 114.

As shown in FIG. 3B, at step 322, process 300 includes, in response to determining that a captured gesture does not match a predefined gesture, incrementing a failed attempt counter. For example, in response to determining that a captured gesture does not match a predefined gesture, payment instrument 114 may increment a failed attempt counter. As an example, in response to the captured gesture of the one or more captured gestures not matching a predefined gesture of the one or more predefined gestures stored in the memory of payment instrument 114, payment instrument 114 may increment the counter (e.g., increase current count of the counter by 1, etc.).

As shown in FIG. 3B, at step 324, process 300 includes providing a visual output and/or transmitting an authentication status to an access device. For example, payment instrument 114 may provide a visual output and/or transmit an authentication status to access device 158. As an example, payment instrument 114 (e.g., visual output control module 157, etc.) may control, based on a current count of the counter, visual output component 159 to provide a visual output to the user (e.g., a visual output associated with the "ACTIVE" state and/or the current count of the counter, such as controlling a multicolor LED to emit a color of light representing a current count or attempt-to-threshold ratio, etc.) and/or transmit, with contactless chip 154, to access device 158, an authentication status associated with the user. For example, the authentication status may be determined based on whether the captured gesture of the one or more captured gestures matches the at least one of the one or more predefined gestures. As an example, the authentication status may be provided as "FAILURE" state in step 324 in response to the captured gesture of the one or more captured gestures not matching a predefined gesture of the one or more predefined gestures stored in the memory of payment instrument 114. Processing may then return to step 304 when payment instrument 114 next detects, with contactless chip 154, an operating field of access device 158.

In some non-limiting embodiments or aspects, payment instrument 114 may establish, with contactless chip 154, another communication with a third-party application executing on access device 158 and/or user device 112 through the near-field communication protocol. For example, payment instrument 114 may receive, with contactless chip 154, from the third-party application executing on access device 158 and/or user device 112, a command to reset the current count of the counter, and in response to receiving the command, payment instrument 114 may reset the current count of the counter (e.g., reset the counter to 0, etc.). As an example, the user may log into the web portal or mobile application as described herein and select appropriate options for resetting the counter.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method comprising:

storing, with a memory of a payment instrument, gesture data associated with one or more predefined gestures;

detecting, with a contactless chip of the payment instrument, an operating field of an access device;

establishing, with the contactless chip of the payment instrument, a communication with the access device through a near-field communication protocol;

after detecting the operating field of the access device, capturing, with a sensor of the payment instrument, further gesture data associated with one or more gestures made by a user by moving the payment instrument in the operating field of the access device by at least one of: (i) capturing, with an accelerometer, as the further gesture data associated with the one or more predefined gestures, a tilting motion and an orientation of the payment instrument made by the user by moving the payment instrument in the operating field of the access device, (ii) capturing, with a gyroscope, as the further gesture data associated with the one or more predefined gestures, a rotation of the payment instrument made by the user moving the payment instrument in the operating field of the access device, or any combination thereof;

comparing, with a processor of the payment instrument, the further gesture data associated with the one or more captured gestures to the gesture data associated with the one or more predefined gestures stored in the memory of the payment instrument to determine whether a captured gesture of the one or more captured gestures matches at least one of the one or more predefined gestures;

determining, with the processor of the payment instrument, based on the comparing, a failed gesture-authentication attempt in which the captured gesture of the one or more captured gestures does not match any predefined gesture of the one or more predefined gestures stored in the memory of the payment instrument;

incrementing, with the processor of the payment instrument, a counter that represents a current number of the failed gesture-authentication attempts made with the payment instrument in the operating field of the access device;

determining, with the processor of the payment instrument, based on a current count of the counter and a predetermined threshold count stored in the memory of the payment instrument, a failed attempts state;

storing, with the memory of the payment instrument, the failed attempts state; and controlling, with the processor of the payment instrument, based on the failed attempts state, a visual output component of the payment instrument to provide, on the payment instrument, a visual output to the user indicating the failed attempts state.

2. The method of claim 1, further comprising:

transmitting, with the contactless chip of the payment instrument, the failed attempts state to the access device through the established near-field communication protocol, wherein receiving the failed attempts state causes the access device to provide a message associated with the failed attempts state to the user.

3. The method of claim 2, further comprising:

storing, with the memory of the payment instrument, a gesture enablement state, wherein the gesture enablement state is either of "ACTIVE" state or "INACTIVE" state;

determining, with the processor of the payment instrument, that the failed attempts state fails to satisfy the predetermined threshold count; and in response to determining that the failed attempts state fails to satisfy the predetermined threshold count, transmitting, with the contactless chip of the payment instrument, the gesture enablement state to the access device through the established near-field communication protocol.

4. The method of claim 3, wherein the processor of the payment instrument further controls the visual output component of the payment instrument to provide the visual output to the user based on the gesture enablement state.

5. The method of claim 1, further comprising:

establishing, with the contactless chip of the payment instrument, another communication with a third-party application executing on an external device through the near-field communication protocol;

receiving, with the contactless chip of the payment instrument, from the third-party application executing on the external device, a command to reset the counter; and in response to receiving the command, resetting, with the processor of the payment instrument, the counter.

6. The method of claim 1, wherein the sensor further includes at least one of the following sensors: a magnetometer, a pressure sensor, an altimeter, or any combination thereof.

7. The method of claim 1, wherein capturing, with the sensor of the payment instrument, the further gesture data includes capturing, with the accelerometer, as the further gesture data, the tilting motion and the orientation of the payment instrument made by the user moving the payment instrument in the operating field of the access device.

8. The method of claim 1, wherein capturing, with the sensor of the payment instrument, the further gesture data includes capturing, with the gyroscope, as the further gesture data, the rotation of the payment instrument made by the user moving the payment instrument in the operating field of the access device.

9. The method of claim 1, further comprising:

transmitting, with the contactless chip of the payment instrument, to the access device, an authentication status associated with the user, wherein the authentication status is determined based on whether the captured gesture of the one or more captured gestures matches the at least one of the one or more predefined gestures.

10. The method of claim 1, wherein the visual output component includes a multicolor light emitting diode (LED) on the payment instrument.

11. A payment instrument, comprising:

a memory configured to store gesture data associated with one or more predefined gestures;

a contactless chip configured to detect an operating field of an access device and establish a communication with the access device through a near-field communication protocol;

a sensor configured to capture, after the operating field of the access device is detected by the contactless chip, further gesture data associated with one or more gestures made by a user by moving the payment instrument in the operating field of the access device, wherein the sensor includes at last one of: (i) an accelerometer configured to capture, as the further gesture data associated with the one or more predefined gestures, a tilting motion and an orientation of the payment instrument made by the user by moving the payment instrument in the operating field of the access device, (ii) a gyroscope configured to capture, as the further gesture data associated with the one or more predefined gestures, a rotation of the payment instrument made by the user moving the payment instrument in the operating field of the access device, or any combination thereof;

a visual output component configured to provide a visual output to the user; and a processor configured to:

compare the further gesture data associated with the one or more captured gestures to the gesture data associated with the one or more predefined gestures stored in the memory of the payment instrument to determine whether a captured gesture of the one or more captured gestures matches at least one of the one or more predefined gestures;

determine, based on the comparing, a failed gesture-authentication attempt in which the captured gesture of the one or more captured gestures does not match any predefined gesture of the one or more predefined gestures stored in the memory of the payment instrument;

increment a counter that represents a current number of the failed gesture-authentication attempts made with the payment instrument in the operating field of the access device;

determine, based on a current count of the counter and a predetermined threshold count stored in the memory of the payment instrument, a failed attempts state;

store, in the memory, the failed attempts state; and control, based on the failed attempts state, the visual output component of the payment instrument to provide, on the payment instrument, the visual output to the user, the visual output to the user indicating the failed attempts state.

12. The payment instrument of claim 11, wherein the contactless chip is further configured to transmit the failed attempts state to the access device through the established near-field communication protocol, wherein receiving the failed attempts state causes the access device to provide a message associated with the failed attempts state to the user.

13. The payment instrument of claim 12, wherein the memory is further configured to store a gesture enablement state, wherein the gesture enablement state is either of "ACTIVE" state or "INACTIVE" state, and wherein the processor is further programmed and/or configured to:

determine that the failed attempts state fails to satisfy the predetermined threshold count; and in response to determining that the failed attempts state fails to satisfy the predetermined threshold count, control the contactless chip of the payment instrument to transmit the gesture enablement state to the access device through the established near-field communication protocol.

14. The payment instrument of claim 13, wherein the processor is further programmed and/or configured to:

control the visual output component of the payment instrument to provide the visual output to the user based on the gesture enablement state.

15. The payment instrument of claim 11, wherein the contactless chip is further configured to establish another communication with a third-party application executing on an external device through the near-field communication protocol and receive, from the third-party application executing on the external device, a command to reset the counter, and wherein the processor is further programmed and/or configured to:

in response to receiving the command, reset the counter.

16. The payment instrument of claim 11, wherein the sensor further includes at least one of the following sensors: a magnetometer, a pressure sensor, an altimeter, or any combination thereof.

17. The payment instrument of claim 11, wherein the sensor includes the accelerometer, and wherein the accelerometer captures the tilting motion and the orientation of the payment instrument in the operating field of the access device as the further gesture data associated with the one or more gestures made by the user moving the payment instrument in the operating field of the access device.

18. The payment instrument of claim 11, wherein the sensor includes the gyroscope, and wherein the gyroscope captures the rotation of the payment instrument made by the user with the payment instrument in the operating field of the access device as the further gesture data associated with the one or more gestures made by the user moving the payment instrument in the operating field of the access device.

19. The payment instrument of claim 11, wherein the contactless chip is further configured to transmit, to the access device, an authentication status associated with the user, wherein the authentication status is determined based on whether the captured gesture of the one or more captured gestures matches the at least one of the one or more predefined gestures.

20. The payment instrument of claim 11, wherein the visual output component includes a multicolor light emitting diode (LED) on the payment instrument.

* * * * *